United States Patent
Müller et al.

(10) Patent No.: US 11,454,211 B2
(45) Date of Patent: Sep. 27, 2022

(54) ADJUSTMENT AND/OR DRIVE UNIT, WIND POWER PLANT HAVING SUCH AN ADJUSTMENT AND/OR DRIVE UNIT, AND METHOD FOR CONTROLLING SUCH AN ADJUSTMENT AND/OR DRIVE UNIT

(71) Applicant: Liebherr-Components Biberach GmbH, Biberach an der Riss (DE)

(72) Inventors: Johannes Müller, Buttenwiesen (DE); Martin Dahl, Wettingen (CH); Oliver Wennheller, Leutkirch (DE); Clemens Christ, Biberach (DE); Oliver Fenker, Warthausen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 11 days.

(21) Appl. No.: 15/983,933

(22) Filed: May 18, 2018

(65) Prior Publication Data

US 2018/0372071 A1 Dec. 27, 2018

Related U.S. Application Data

(63) Continuation of application No. PCT/EP2016/001926, filed on Nov. 18, 2016.

(30) Foreign Application Priority Data

Nov. 20, 2015 (DE) ...................... 10 2015 015 070.7
Feb. 19, 2016 (DE) ...................... 10 2016 002 006.7

(51) Int. Cl.
*F03D 7/02* (2006.01)
*F03D 17/00* (2016.01)
(Continued)

(52) U.S. Cl.
CPC ......... *F03D 7/0204* (2013.01); *F03D 7/0224* (2013.01); *F03D 7/0248* (2013.01); (Continued)

(58) Field of Classification Search
CPC ...... F03D 7/0204; F03D 7/0248; F03D 7/047; F03D 17/00; F05B 2270/329;
(Continued)

(56) References Cited

U.S. PATENT DOCUMENTS

| | | | |
|---|---|---|---|
| 5,035,575 A | 7/1991 | Nielsen et al. | |
| 6,927,502 B2 * | 8/2005 | Wobben | F03D 7/0204 290/44 |

(Continued)

FOREIGN PATENT DOCUMENTS

| | | |
|---|---|---|
| CN | 102003340 | 4/2011 |
| CN | 102022262 | 4/2011 |

(Continued)

OTHER PUBLICATIONS

Machine translation of DE102008013864 (Year: 2009).*

*Primary Examiner* — Christopher R Legendre
(74) *Attorney, Agent, or Firm* — Levine Bagade Han LLP

(57) ABSTRACT

The present invention relates to adjustment and/or drive units which can be used in wind power plants for adjusting the azimuth angle of the nacelle of the wind power plant or the pitch angle of the rotor blades, wherein such an adjustment and/or drive unit has at least two adjusting drives for rotating two assemblies which are mounted so as to be rotatable relative to each other, and has a control device for controlling the adjusting drives. The control device controls the adjusting drives in such a manner that the adjusting drives are braced relative to each other during the rotation of the two assemblies and/or when the assemblies are at standstill. The invention further relates to a wind power (Continued)

plant comprising such an adjustment and/or drive unit, and to a method for controlling such an adjustment and/or drive unit. According to the invention, the control device comprises a bracing-adjustment device for variably adjusting the intensity of the bracing of the adjusting drives as a function of a variable external load on the assemblies being adjusted, wherein the intensity can be determined by means of a load determining device. According to another aspect of the invention, an overload protection is included, wherein the individual loads of the individual adjusting drives are determined by load determining devices and, in the event that an adjusting drive reaches overload, the distribution of the drive torques is modified in such a manner that the adjusting drive reaching overload is relieved or at least not further loaded, and at least one further adjusting drive is more heavily loaded in a supporting manner or is less heavily loaded in a bracing manner.

38 Claims, 16 Drawing Sheets

(51) Int. Cl.
 *F03D 7/04* (2006.01)
 *F03D 80/70* (2016.01)
 *F03D 80/00* (2016.01)
(52) U.S. Cl.
 CPC ............ *F03D 7/047* (2013.01); *F03D 17/00* (2016.05); *F03D 80/00* (2016.05); *F03D 80/70* (2016.05); *F05B 2240/40* (2013.01); *F05B 2240/50* (2013.01); *F05B 2260/79* (2013.01); *F05B 2270/1095* (2013.01); *F05B 2270/32* (2013.01); *F05B 2270/321* (2013.01); *F05B 2270/328* (2013.01); *F05B 2270/329* (2013.01); *F05B 2270/331* (2013.01); *F05B 2270/335* (2013.01); *Y02E 10/72* (2013.01)
(58) Field of Classification Search
 CPC .......... F05B 2270/331; F05B 2270/335; F05B 2270/1095
 See application file for complete search history.

(56) References Cited

U.S. PATENT DOCUMENTS

| | | | | |
|---|---|---|---|---|
| 8,075,266 | B2* | 12/2011 | Keller | F03D 7/0204 416/37 |
| 8,177,510 | B2* | 5/2012 | Nies | F03D 7/0204 416/169 R |
| 8,461,707 | B2* | 6/2013 | Fujino | F03D 7/0204 290/44 |
| 8,480,367 | B2* | 7/2013 | Nielsen | F03D 7/0204 416/170 R |
| 8,746,101 | B2* | 6/2014 | Hausladen | B66C 23/86 74/421 A |
| 9,261,077 | B2* | 2/2016 | Tirumalai | F03D 7/0204 |
| 9,932,964 | B2* | 4/2018 | Janβen | F03D 7/0268 |
| 10,100,810 | B2* | 10/2018 | Frederiksen | F03D 7/0204 |
| 2007/0158926 | A1 | 7/2007 | Hahmann | |
| 2010/0143136 | A1* | 6/2010 | Daniels | F03D 7/0224 416/147 |
| 2011/0012360 | A1* | 1/2011 | Numajiri | F03D 7/0204 290/55 |
| 2018/0372071 | A1* | 12/2018 | Muller | F03D 7/047 |

FOREIGN PATENT DOCUMENTS

| | | |
|---|---|---|
| CN | 103047082 | 4/2013 |
| CN | 104061123 | 9/2014 |
| DE | 10023440 | 12/2001 |
| DE | 102007049368 | 5/2008 |
| DE | 102013207322 | 10/2014 |
| DE | 102008013864 | 12/2014 |
| EP | 2101058 | 9/2009 |
| EP | 2280191 | 7/2010 |
| EP | 2495435 | 9/2012 |
| EP | 2290230 | 6/2013 |
| EP | 2781738 | 9/2014 |
| EP | 2796710 | 10/2014 |
| EP | 3018344 | 5/2016 |
| WO | WO 2012/000504 | 1/2012 |
| WO | WO 2014/071947 | 5/2014 |
| WO | WO 2017/084755 | 5/2017 |

* cited by examiner

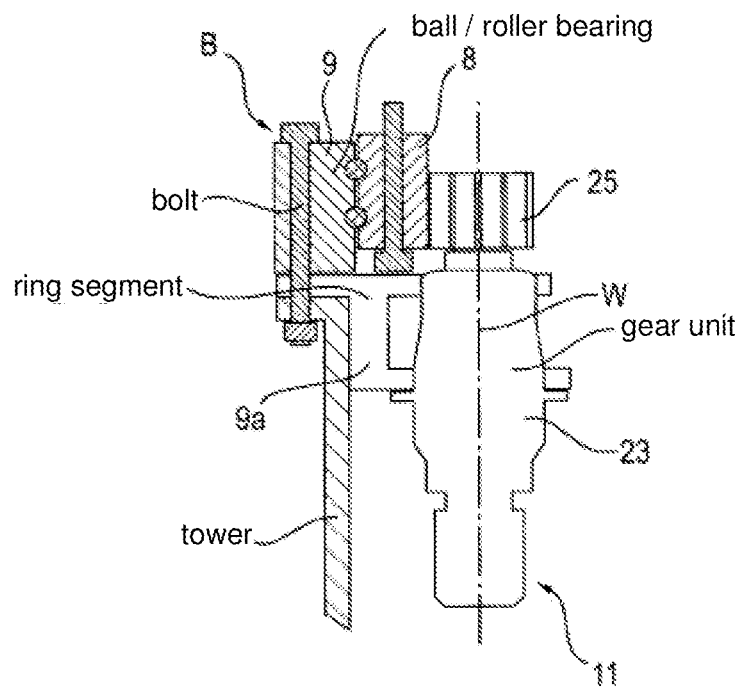
FIG. 4(c)
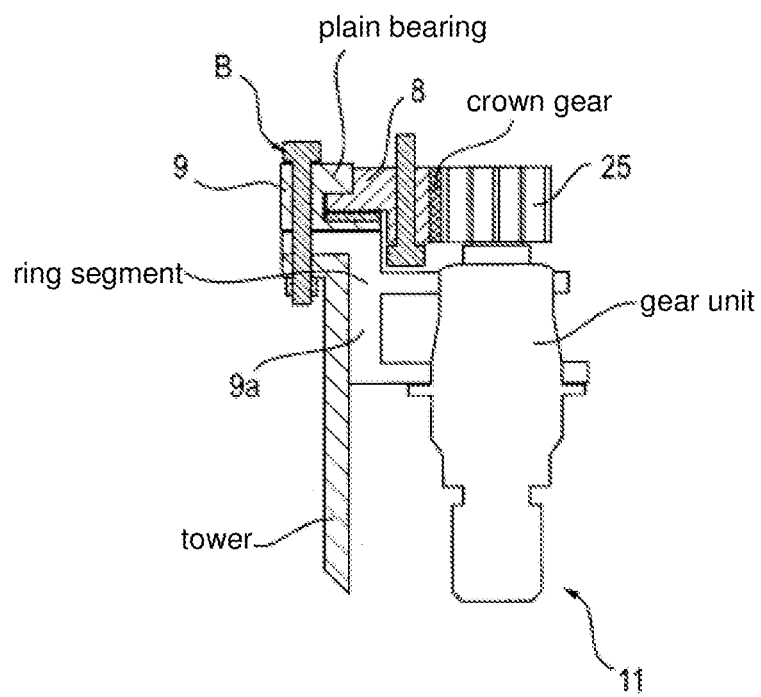

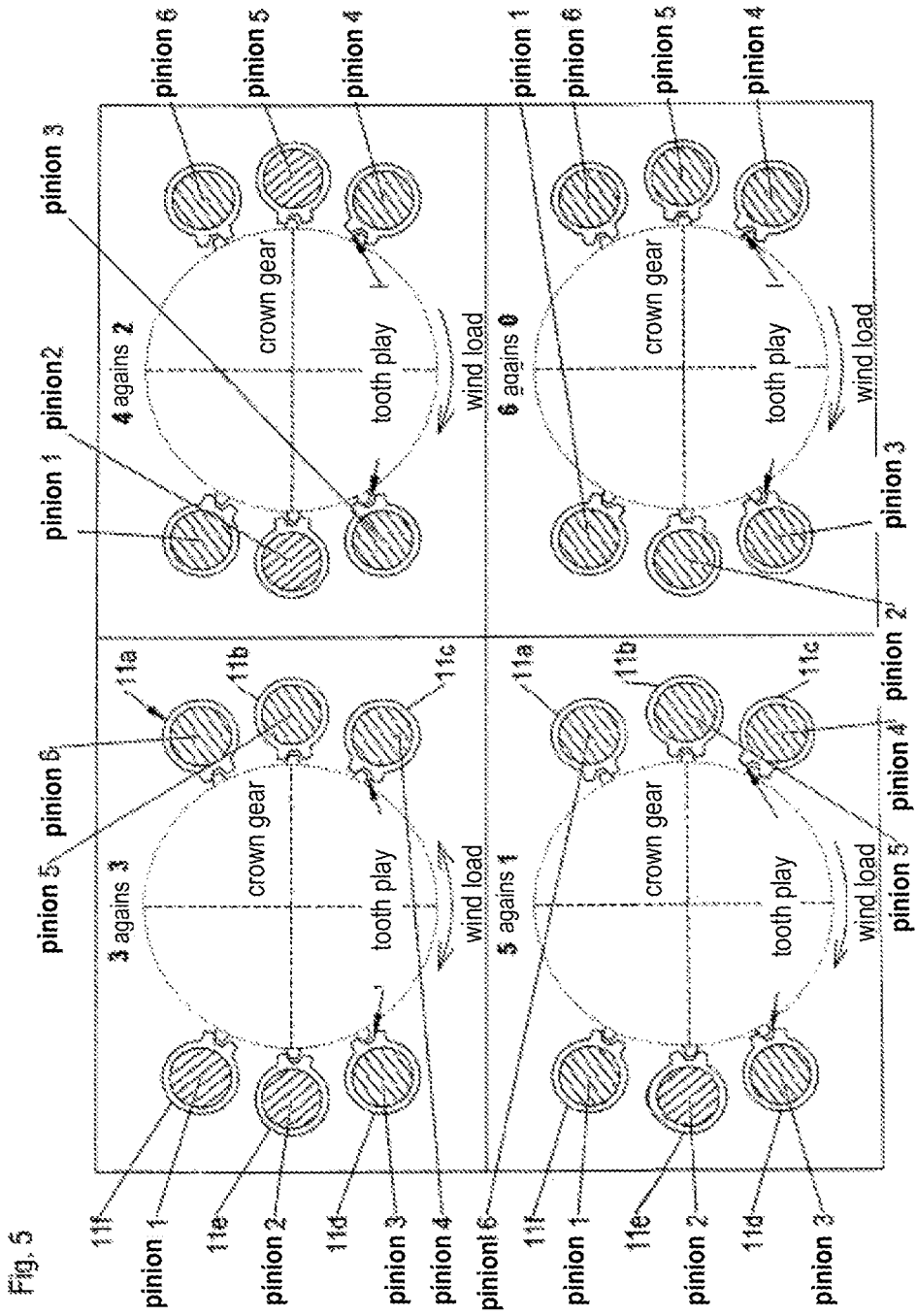

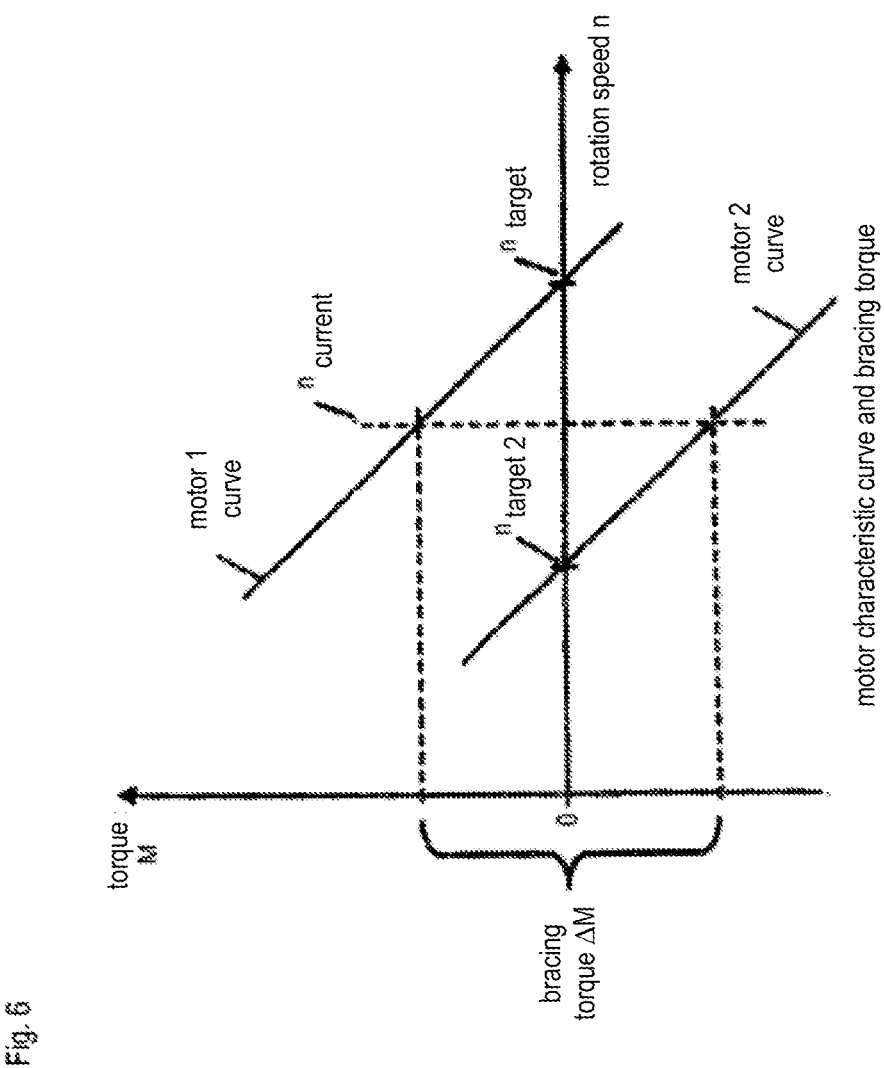

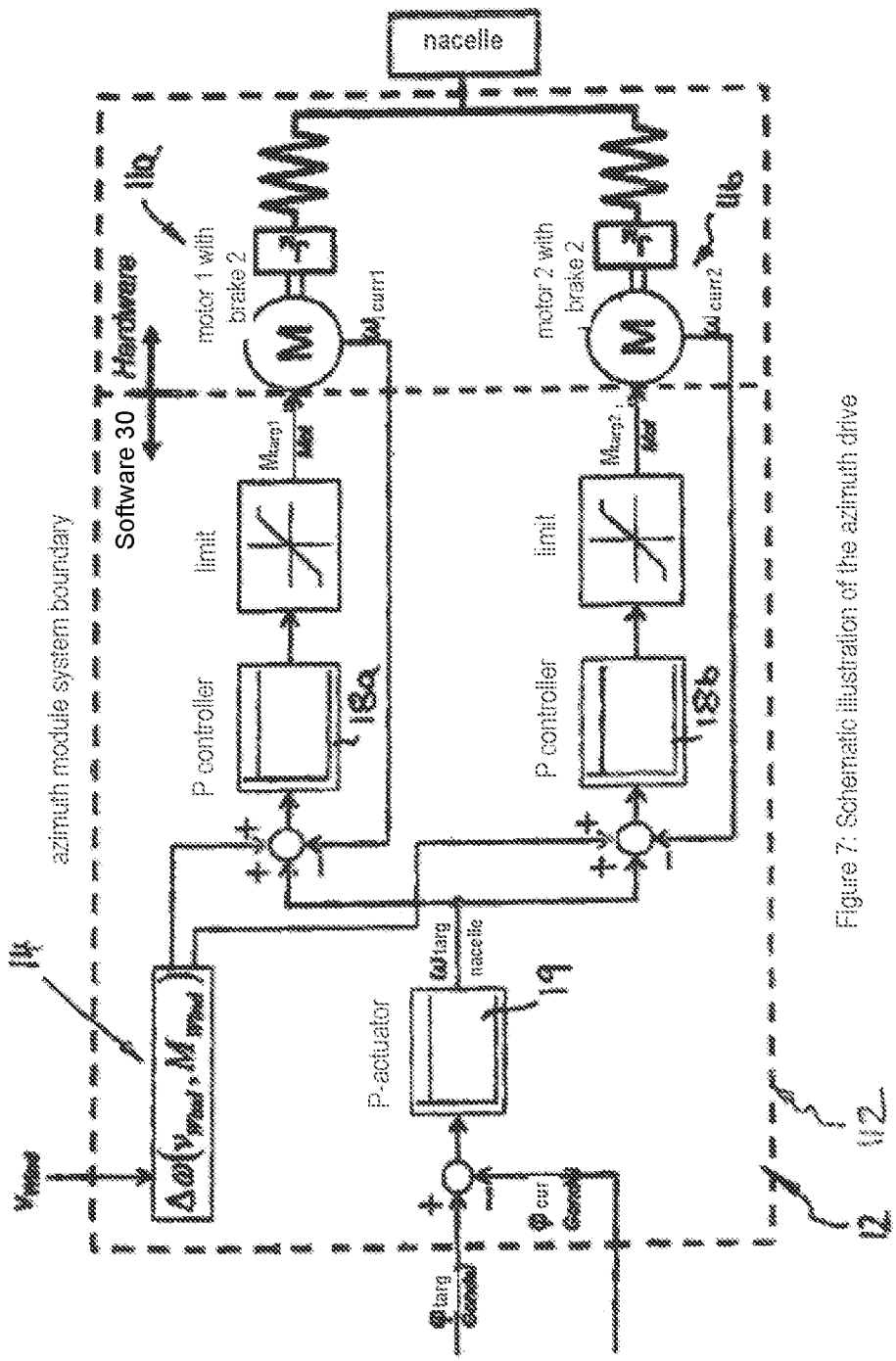
Figure 7: Schematic illustration of the azimuth drive

ADJUSTMENT AND/OR DRIVE UNIT, WIND POWER PLANT HAVING SUCH AN ADJUSTMENT AND/OR DRIVE UNIT, AND METHOD FOR CONTROLLING SUCH AN ADJUSTMENT AND/OR DRIVE UNIT

CROSS-REFERENCE TO RELATED APPLICATIONS

The present application is a continuation of International Application No. PCT/EP2016/001926, filed Nov. 18, 2016, which claims priority to German Patent Application Nos. 10 2015 015 070.7, filed Nov. 20, 2015; and 10 2016 002 006.7, filed Feb. 19, 2016, both of which are incorporated by reference herein in their entireties.

BACKGROUND

1) Technical Field

The present invention relates to adjustment and/or drive units as can be used in wind power plants for adjusting the azimuth angle of the wind power plant nacelle or the pitch angle of the rotor blades, or in other large rotary mechanisms such as the slewing ring of a crane or an excavator, wherein such an adjustment and/or drive unit has at least two adjusting drives for rotating two assemblies which are mounted so as to be rotatable relative to each other, and has a control device for controlling the adjusting drives. Said control device controls the adjusting drives in such a manner that the adjusting drives are braced relative to each other during the rotation of the two assemblies and/or when the assemblies are at standstill. The invention further relates to a wind power plant comprising such an adjustment and/or drive unit, and to a method for controlling such an adjustment and/or drive unit.

2) Description of the Related Art

For large rotary drives, which are subjected to great external loads—as is the case, for example, with azimuth adjusting drives of wind power plants or the slewing gear of a derrick crane—usually several adjusting drives are used which together adjust the two assemblies being rotated. The adjusting drives in this case can include a motor, for example in the form of an electric motor, which drives, via a gear unit—for example, a planetary gear—a drive gear such as a pinion, which engages with a crown gear to rotate the crown gear. The assemblies to be adjusted can be, for example, the two bearing rings of a large diameter slewing ring and/or large diameter plain bearing, by means of which the nacelle or a tower section supporting the nacelle is mounted rotatably on the tower of the wind power plant about an upright axis, or the rotary platform of a derrick crane is mounted on the crawler track of the same. By rotating the two bearing rings, the nacelle can then be rotated relative to the tower and/or the rotary platform can be rotated relative to the undercarriage.

Due to play in the toothing, this rotation results in mobility in the drive trains, such that, despite the use of multiple adjusting drives, the nacelle and/or the rotary platform can react with undesirable dynamics, for example in the form of rotatory vibrations. The aforementioned mobilities and elasticities in the drive train can be due to a variety of causes in this case—for example, in addition to backlash in the tooth engagement between the pinion and the crown gear, there can be compliances in the gear units which are employed, or compliances in the mounts of the adjusting drives, which are usually attached to appropriate machine supports which possess only limited stiffness.

To avoid excessively high dynamic effects arising during the nacelle adjustment of wind power plants due to such mobilities, it has been customary to-date to use a service brake—for example, a hydraulic brake—and to execute the adjustment of the assemblies relative to each other in opposition to a certain braking force. That is, the service brake is applied during the adjustment, and provides a certain braking force which is overcome by the adjusting drives. As a result, unwanted dynamic fluctuations due to elasticities in the drive train can be controlled and suppressed. The disadvantage of this, however, is that increased wear can occur on the drives, the adjusting drives must be oversized in order to not only be able to apply the adjusting forces per se, but also to overcome the braking force. In addition, the service brake per se must be designed accordingly and space must be provided for it. At the same time, the service brake is subject to a high degree of wear and maintenance requirements.

On the other hand, it has already been proposed to dispense with such a service brake and/or to perform the adjustment movement without the braking force of a service brake, and to brace the adjusting drives against each other instead. Such a bracing of the adjusting drives of the azimuth-adjusting device of a wind power plant is shown, for example, in DE 10 2008 013 864 B4. The publication suggests dividing the required total drive torque in the main axis among the plurality of adjusting drives, wherein at least one of the adjusting drives opposes the desired direction of rotation with a low counter-torque to achieve a bracing of the adjusting drives against each other. For this purpose, different target speeds with a speed difference in the range of 20 to 100 revolutions per minute are specified to the adjusting drives, to produce an opposing torque which should be on the order of 5-10% of the drive torque of the other adjusting drives.

In addition, an azimuth adjusting system for the nacelle of a wind power plant is also known from EP 22 90 230 B1, which operates with a plurality of adjusting drives, each of which is assigned its own controller, wherein all of the controllers communicate with each other and with a higher-level controller. In this case, all adjusting drives should work in the same direction of rotation in a first operating mode to turn the nacelle into the wind. In contrast, in a second operating mode in which the nacelle is to be held in rotational standstill, the adjusting drives are braced against each other.

Further adjusting drive systems for nacelles of wind power plants are known from DE 10 2007 049 386 A1, DE 10 2013 207 322 and US 2007/0158926 A1.

This manner of braced operation of the plurality of adjusting drives can reduce the undesirable dynamic effects due to play in the drive train—although only to a certain extent. However, under unfavorable conditions, such as high alternating loads, swaying and/or insufficient suppression of the dynamic effects can occur nonetheless. On the other hand, the adjusting drives and the drive train are unnecessarily loaded in calm phases—for example, with no wind—in which no major damping of dynamic effects would be necessary, thereby leading to premature wear.

On the other hand, overloading can occur in such adjusting drive systems, which can lead to damage to individual adjusting drives or destruction of components. Since, in a system with a plurality of adjusting drives which are used in a force-locking configuration, the individual adjusting drives cannot be designed in such a manner that they each individually transmit the entire force, asymmetrical loads can lead to overload of a drive. If each drive were individually designed in such a manner that it alone could transmit the entire maximum load, the system as a whole would be drastically oversized. The adjusting drives are therefore usually designed in such a manner that they collectively apply the adjusting forces, and the total required adjusting torques and adjusting forces are distributed over the drives.

When the potential overloads mentioned above occur, it is possible in some cases that difficult to replace components will be destroyed. The greatest damage is caused by the area in which all drives direct their forces being destroyed, because in this case, emergency operation by means of only a few adjusting drives is no longer possible. In a crown gear drive of the aforementioned type, as used in azimuth modules of wind power plants or large slewing rings—for example, of cranes—destruction of the crown gear and/or the tooth flanks of such a crown gear brings the entire system down, resulting in a very long downtime since the crown gear cannot be directly reconstructed.

To prevent this type of major damage and longer downtimes, it has already been suggested to incorporate predetermined breaking points in less critical components in order to protect the more critical components from destruction and to make replacement of the component destroyed at the predetermined breaking point easier. For example, EP 2 280 191 B1 shows an adjusting drive of the type mentioned, in which the large crown gear is to be protected from destruction by the output shafts of the adjusting drives having predetermined breaking points—for example, in the form of a corresponding notch directly in the output shaft or a shaft flange connected thereto. Said output shaft in this case is seated between a pinion, which meshes with the crown gear, and a transmission via which said output shaft is driven by an electric motor.

Such mechanical breaking points on the output shaft of the adjusting drives do indeed protect the crown gear and the gear unit of the adjusting drives from destruction and/or damage, and only a relatively simpler, cheaper component must be replaced. Nevertheless, there are downtimes for the repair, and a corresponding loss of output.

Proceeding from this point, the object of the present invention is to create an improved adjustment and/or drive unit, an improved method for controlling such an adjustment and/or drive unit, and an improved wind power plant having such an adjustment and/or drive unit, which avoid the disadvantages of the prior art and further develop the latter in an advantageous manner. A particular goal is to improve the compensation of the mobilities in the drive train, in a manner which reliably suppresses undesirable dynamic effects during the adjustment of the angular position even under unfavorable conditions, while reducing the load and the wear of the adjusting drives and of the drive train and enabling a solution with fewer adjusting drives.

A further goal is a reliable overload protection that avoids or at least shortens downtimes of the adjustment and/or drive unit and of the system equipped with it.

SUMMARY

According to the invention, the object named above is achieved by adjustment and/or drive units, a wind power plant, and a method for controlling such an adjustment and/or drive units.

Accordingly, the invention suggests adapting, to the external loads, the bracing of the adjusting drives against each other during the movement of the assemblies being adjusted, so as to not unnecessarily burden the adjusting drives, and to also achieve sufficient bracing and thus damping of the dynamic effects under unfavorable conditions. According to the invention, the control device comprises a bracing-adjustment device for variably adjusting the intensity of the bracing of the adjusting drives as a function of a variable external load on the assemblies being adjusted, wherein said intensity can be determined by means of a load determining device. If strong bracing is necessary due to the external loads, the bracing-adjustment device provides greater and/or sufficiently strong bracing. Weaker bracing can be provided if conditions permit, so as not to burden the adjusting drives unnecessarily. This manner of intelligent adaptation of the bracing of the adjusting drives to the external loads on the components being adjusted, in particular the nacelle which is rotated and the rotor attached to the same, or on the revolving platform of a crane, allows the use of smaller and/or fewer adjusting drives, as well as the prevention of premature wear, all the while still minimizing unwanted dynamic effects even under unfavorable conditions. Maintenance requirements are reduced in this case.

In particular, the bracing-adjustment device can be designed in such a manner that, with increasing external loads and/or with increasing load fluctuations, the bracing of the adjusting drives is increased, whereas with decreasing external loads and/or only small or no fluctuations in the external load, a weaker bracing of the adjusting drives can be implemented.

Basically, in this case a stepwise adjustment of the bracing can be sufficient, particularly if a sufficient number of stages, for example three or more stages, and in particular five or more stages, are provided, although only two stages may be sufficient. This can simplify the control of the adjusting drives and avoid excessive calculations of the control device. Alternatively, however, the bracing can be adjusted continuously in order to achieve the finest possible adaptation of the bracing to the external boundary conditions.

The external loads can be determined and/or taken into account in various ways. The load can be determined directly or indirectly.

In an advantageous development of the invention, a wind detection device may be included, which detects the wind strength and/or wind direction and/or the regularity of the wind field, such that the bracing can be adapted variably according to the detected wind strength and/or wind direction and/or fluctuations in the wind strength and/or direction. In particular, the bracing-adjustment device can be designed to increase the bracing of the adjusting drives in the event of increasing wind strength and/or increasing irregularity of the wind field due to gusts and/or blasts of wind. For example, at lower wind speeds, and up to a certain threshold—for example, less than 10 m/sec. or less than 5 m/sec.—a weaker bracing in the range of 20 N m is implemented, for example; whereas at higher wind speeds above a predetermined wind threshold of, for example, more than 10 m/sec., a stronger bracing is implemented—for example, in the range of 30 N m or greater. Instead of a range-based adjustment with wind speed thresholds, a multi-step adjustment or a stepless adjustment can also be used, optionally along with the use of an attenuator, so as to avoid the need to adapt the control process for each little wind speed change.

Alternatively or in addition to the consideration of the wind speed, the wind direction and/or the irregularity of the wind field can also be taken into consideration—for example in such a manner that, when the wind direction is switching back and forth, and/or there are stronger fluctuations in the wind field which alternately increase the load on different adjusting drives, a symmetrical bracing is implemented in which the number of adjusting drives operated with a torque in the target direction of rotation is the same as the number of adjusting drives operated with a torque opposing the target direction of rotation. As such, if the wind is switching direction back and forth, or if the wind field is generally irregular, such that a more strongly fluctuating load is placed first on one adjusting drive group and then on the other adjusting drive group, the bracing-adjustment device braces, by way of example, two adjusting drives against two adjusting drives, or three against three adjusting drives. That is to say, two adjusting drives propel the adjustment movement while two other adjusting drives brake the adjustment movement or—in the three-against-three configuration—three adjusting drives propel the adjustment movement while three adjusting drives oppose them. Accordingly, the adjusting drives can be braced even when the rotation unit is at standstill—for example, two against two or three against three, or other constellations.

On the other hand, if the wind direction results in the adjusting drives being loaded one only one side, or asymmetrically, the bracing-adjustment device can implement an asymmetric bracing in which more adjusting drives propel the adjustment movement than adjusting drives which brake the adjustment movement, or the contrary in which fewer adjusting drives propel the adjustment movement than adjusting drives which brake this adjustment movement—according to the direction in which the external load loads the multiple adjusting drives asymmetrically. Such an asymmetric bracing can even be implemented in a corresponding manner at standstill.

Such a symmetrical or asymmetrical bracing of the adjusting drives with an equal or different number of adjusting drives operating in opposing directions can be implemented by the bracing-adjustment device alternatively or additionally to a procedure which takes into account the wind conditions, and can also be based on other parameters and/or indicators of the load. By way of example, the bracing-adjustment device can evaluate the actually-occurring load on the adjusting drives, for example by evaluating their consumption of current, in order to determine whether there is an overall symmetrical load or an asymmetrical load. Subsequently, a symmetrical or asymmetrical bracing can then be implemented in the manner named above.

In particular, the load determining device—alternatively or in addition to a direct wind detection and/or wind field detection—can determine the load profile and/or torque profile on the adjusting drives, in order to variably adjust the strength and distribution of the bracing of the adjusting drives relative to each other according to the same. The load determining device may advantageously have a load amplitude determiner for determining the load amplitudes arising for at least one adjusting drive, wherein the bracing-adjustment device may be designed to implement an increasingly stronger bracing for increasingly greater load amplitudes. This approach is based on the consideration that, when wind loads fluctuate more strongly and/or the wind field is increasingly more irregular, the loads induced on the adjusting drives fluctuate more strongly and/or the induced load amplitudes are increasingly greater.

Advantageously, said load amplitude determiner can be provided to determine the load amplitudes from an unfiltered load signal—for example maximum and minimum values over a predetermined, preferably short, time period of, for example, a few seconds—and to determine the load amplitude from the maximum and minimum values occurring within a specific time interval.

The load signal utilized by the load determining device for determining the loads on the adjusting drives can be obtained in several different ways. For example, by means of a torque measuring device, the torque on the adjusting drive and/or an associated gear unit, and/or on a drive train element, can be measured, wherein the unfiltered amplitudes of the torque signal can be evaluated. Alternatively, or additionally, strains and/or deformations occurring on a component of the adjusting drive and/or of the drive train can be determined by means of a strain measuring device, for example a strain gauge, in order to determine the amplitudes by using the strain signal in the manner mentioned. Also, alternatively or additionally, a reaction force can also be measured by means of a force sensor and/or a force measuring device—for example, on a bearing element of the adjusting drive or a drive train element—in order to determine therefrom the load amplitudes that are induced by fluctuating wind loads.

Alternatively or additionally, the loads of the adjusting drives and/or the loads acting on the adjusting drives can also be measured by sensor elements which are functionally assigned to an output shaft of the adjusting drives, wherein the sensor element can be attached directly to the output shaft or can be connected to a component which is connected to said output shaft or supports it, according to the construction. For example, a torsion meter which measures a torsion of the output shaft can be attached to the output shaft. Alternatively, or additionally, a strain gauge can detect a deformation of the output shaft or an associated component. Alternatively, or additionally, force and/or torque measurement devices can detect forces and/or torques on the output shaft or associated components, such as shaft or bearing flanges.

The output shaft of the respective adjusting drive to which the sensor element is functionally assigned can advantageously extend between the drive gear—in particular, the pinion—which is in engagement with one of the components which is rotated and a gear unit via which the output shaft is driven by a drive—such as an electric or hydraulic motor. The arrangement of the sensor element on said output shaft can provide an accurate determination of the actual load, especially on the vulnerable components of the system. In particular, this makes it possible to estimate very accurately the tooth flank loads which occur on a slewing ring as a result of the measured loads on the output shaft.

Advantageously, the load determining device is designed in such a manner that the individual loads on each adjusting drive can be determined individually/separately.

Alternatively, or in addition to the measurement of such mechanical values, the load torque and/or the drive loads can also be determined from electrical values of the adjusting drives. For example, the load amplitudes can be calculated and/or determined from electrical current consumption fluctuations and/or voltage fluctuations and/or from values obtainable at the frequency converter.

In order to determine asymmetrical loads on the adjustment and/or drive unit, and/or the strength of the asymmetry of the loads acting on the adjustment and/or drive unit, the load determining device can also be designed to determine an average torque of the adjusting drives, wherein the average value, and/or the value averaged over a time window, of the torques output by the adjusting drives can be considered as an average torque. For example, if it is determined that the adjusting drives taken as a whole must provide a torque of a certain value rotating in a certain direction of rotation in order to complete a movement to a predetermined rotation angle or to hold this position, it can be assumed that an asymmetric wind load is applied to the wind power plant and/or an asymmetric load is applied on the wind power plant adjusting assembly. According to the size and/or duration of the determined average torque, the bracing-adjustment device can implement the bracing variably—for example, in such a manner that the number of adjusting drives rotating in one direction increases and/or the number of adjusting drives rotating in the opposite direction of rotation is lowered. If, for example, a torque which increases continuously or over a relatively long period and which pulls to the left is measured—or, in the case of fluctuating loads, if a torque is measured which primarily pulls to the left—the number of adjusting drives rotating to the right can be increased and/or the number of adjusting drives rotating to the left can be reduced. Alternatively, or additionally, the bracing can also be shifted in one or the other direction of rotation—for example, by increasing the torque of the adjusting drives rotating in one direction and/or lowering the torque of the adjusting drives rotating in the other direction.

The aforementioned determination of asymmetrical loads on the adjustment and/or drive unit, for example by the aforementioned determination of the average torque of the adjusting drives, can also be used to determine the wind direction, which may be more accurate than a direct measurement of the wind direction by an anemometer and can be used to move the nacelle and/or the rotor of the wind power plant exactly in the wind. For example, the control device can readjust the target angular position until asymmetrical loads are no longer detected and/or the asymmetry of the external loads becomes minimal.

There are several different ways to proceed in order to precisely determine the external loads and/or the torques/loads induced on the adjusting drives even at standstill. For example, while the corresponding adjusting drive is in operation, the torque may be calculated by means of the frequency converters. Alternatively, or additionally, when the motor is switched off and a standstill brake is applied, the torque can be measured on a stationary structural part of the drive and/or the brake via the previously mentioned torque measuring device and/or load measuring device, for example in the form of a measuring flange and/or strain gauge, for example via a strain gauge on the engine or brake housing.

Alternatively, or in addition to such a torque determination by a measuring flange or strain gauges, the torque can also be determined by monitoring the angle of rotation of a drive gear and/or an element of the drive train, in particular the output pinion of an adjusting drive. If the stiffness of the adjusting drives is known, when the adjusting drive is at standstill—more specifically, when the motor and/or brake is at standstill—the change in torque can be calculated from a change in the angle of the drive gear, in particular the output pinion. Specifically, a certain change in torque is accompanied by a certain change in angle. In order to determine the absolute magnitude of the torque, the drive torque of the adjusting drive before the shutdown can serve as a basis to be able to determine, via the rotation angle measurement, the change relative to this basis, and therefore always the absolute value of the torque.

Alternatively, or in addition to the adjustment of the bracing, the load torque determined at standstill can also be used to make the switching procedure between brake and motor—that is, from braked standstill to an adjusting movement, or alternatively from motor operation to braked standstill operation—as gentle as possible. For example, the load torque determined in the aforementioned manner can be observed, such that the switch can be made at a time of very little load so as not to overload the gear unit, even if the motor and the brake together hold the rotor for a brief time. Alternatively, or additionally, the sum of the braking and motor torques can be monitored and limited by the adjusting drive controller.

Alternatively, or additionally, the bracing-adjustment device can take into account, for adjusting the bracing, a blade angle/pitch angle of at least one rotor blade. For this purpose, a pitch angle/blade angle detection device can be included, wherein the bracing-adjustment device can vary the bracing of the adjusting drives according to the signal thereof. For example, the bracing-adjustment device may implement stronger bracing for pitch angles which are typically used at higher wind speeds and/or higher system outputs than at pitch angles used at lower wind speeds and/or lower system outputs. This can be based on the consideration that, at corresponding pitch angles, accordingly higher and/or lower dynamic loads are applied to the nacelle, requiring and/or allowing an accordingly stronger or weaker bracing. Advantageously, the bracing-adjustment device can communicate directly with the pitch angle actuator mechanism to take the pitch angle into account when bracing the adjusting drives against each other.

Alternatively, or additionally, a system output furnished by the wind power plant can be taken into account for adjusting the bracing of the adjusting drives. For example, a stronger bracing can be implemented for higher system outputs, and a weaker bracing for lower system outputs. Such an approach is based on the consideration that stronger dynamic forces pull on the nacelle at higher system outputs, and thus a stronger bracing of the adjusting drives is required to achieve a reliable suppression of unwanted dynamic effects when the nacelle is moved into a different azimuth angle.

The adjustment of the bracing can be accomplished by the bracing-adjustment device in several fundamentally different ways. In particular, the bracing-adjustment device can be advantageously provided for the purpose of changing the number of adjusting drives that are operated with a torque in a first direction of rotation and/or the number of adjusting drives that are operated with a torque in the opposite direction of rotation, to thereby adjust the bracing in the desired manner—and in particular to vary the strength of the bracing.

Alternatively, or additionally, the bracing-adjustment device can adjust the bracing of the adjusting drives by variably modifying the spread of the target rotation speeds prespecified for the adjusting drives. For this purpose, the target rotation speed of at least one adjusting drive must be reduced relative to the target rotation speed which must be achieved to accordingly move the assembly, and/or the target rotation speed of at least one adjusting drive must be increased relative thereto.

According to the desired strength of the bracing, different target speed spreads can be used, wherein a target rotation speed difference between a braking and a driving adjusting drive in the range of 100-500 or 200-500 revolutions per minute, by way of example, may be sufficient and advantageous. However, higher rotation speed differences of more than 500 revolutions per minute, and in particular 1000 to 5000 revolutions per minute, can be used. For example, a reasonable or appropriate bracing can be achieved for many adjusting movements with a target speed which is increased or decreased by about 3000 revolutions. On the other hand, rotation speed differences of less than 100 revolutions per minute can be considered.

The bracing-adjustment device can advantageously be designed to change the motor characteristics of the adjusting drives in order to enable a gentler or sharper adjustment and/or adaptation of the bracing. A target torque ($M_{targ1}$) can be prespecified to at least one of the adjusting drives, which differs from at least one further target torque ($M_{targ2}$) prespecified to at least one further adjusting drive of the adjusting drives by at least 10 N m or 15 to 40 N m.

In particular, in an advantageous embodiment of the invention, a dedicated speed controller is functionally assigned to each of the multiple adjusting drives, for each motor thereof, and prespecifies a drive torque for the individual adjusting drive, receiving back the actual rotation speed of the given adjusting drive. In this case, a higher-level rotation speed controller can be included, which prespecifies a target rotation speed to each of the rotation speed controllers for each motor.

This higher-level rotation speed controller can advantageously take into account a plurality of input parameters, in particular a target rotational angle which prespecifies the target position adjustment of the assembly—for example, the desired azimuth angle and/or the desired azimuth angle adjustment of the wind power plant nacelle—and also advantageously, a wind speed signal as well, and/or a torque signal which represents the torque acting on the assembly due to the external loads—for example, the wind torque and/or a load amplitude signal representing the load amplitude on the adjusting drives—and/or further parameters as previously explained, such as the pitch angle. According to the input parameters mentioned, the higher-level rotation speed controller then specifies target rotation speeds for the rotation speed controllers for each motor.

Each of the aforementioned rotation speed controllers for each motor can modify the motor characteristic curve of the respective motor as a function of the prespecified target rotation speed and/or the difference compared to a current speed and/or the target torque to be provided and/or the difference between the target and the current torque, so as to make the motor more yielding, and thereby conserve the gear unit and/or make the same last longer, for example—or, if necessary, to make the motor more responsive, to better counteract dynamic effects in the drivetrain. Optionally, other parameters can be taken into account for the adjustment of the motor characteristic curve of the rotation speed controllers, wherein the characteristic curve adjustment is then based on these.

The higher-level rotation speed controller and/or the rotation speed controller for each motor can be designed in the form of a proportional controller, for example. Advantageously, a limiting module can be arranged downstream of the proportional controllers for each motor, providing a limit to the target torque specified to the motor.

Such a proportional rotation speed controller can particularly be included to influence the slope of the characteristic curves of the adjusting drives. In order to achieve a specific bracing torque, a rotation speed difference can be specified which depends on the proportional component.

With the intelligent control of the bracing of the adjusting drives, the adjustment and/or drive unit can make do without a service brake, and can carry out an adjustment procedure without applying a service brake, although such a service brake may nevertheless be included.

Regardless of whether such a service brake is present, the adjustment and/or drive unit may have a standstill brake, for example in the form of a locking device and/or holding brake which works by positive engagement. This can advantageously be automatically actuated for longer standstill times, and/or optionally for shorter standstill times. For example, such a standstill brake can block the aforementioned large diameter slewing ring and/or large diameter plain bearing to relieve the adjusting drives, and optionally included gear units, and/or can be assigned to a gear unit between the adjusting drive motor and drive pinion and/or drive wheel in order to hold a gear shaft. Alternatively, or additionally, the standstill brake can optionally engage with one or more adjusting drive motors.

The aforementioned adjusting drives can each have an electric motor in an advantageous embodiment of the invention. Alternatively, it would also be possible to include hydraulic motors. Independently of this, the adjusting drives can comprise one or more gears in order to raise or lower the motor rotation speed to the target pinion- and/or drive gear speed.

Regardless of the previously described possibility of bracing, the control device used for controlling the adjusting drives and distributing the drive torque to the adjusting drives can also be used to form an intelligent overload protection, by means of which it is possible to prevent overloads of individual adjusting drives and damage or even destruction possibly resulting therefrom. According to another aspect of the present invention, an overload protection device may be provided which monitors the load conditions of the individual adjusting drives and variably distributes the drive torques to the plurality of adjusting drives, such that in the event of impending overload, the drive torque on an adjusting drive is capped or reduced by means of control, and at least one further adjusting drive engages by means of control to provide support, in order to still provide the total desired drive torque as far as possible.

If it is determined that the force and/or the torque or the load on a drive or on a plurality of drives is too great, or threatens to become too great, the control device controls the further drives in such a manner that the further drives provide a stronger support function, and behave in such a manner that all adjusting drives are operated within their permissible ranges. According to the invention, the adjusting drives are each functionally assigned a load determining device for determining the load acting on the respective adjusting drive, wherein the aforementioned control device is designed to receive load signals from said load determining devices, and upon receipt of a load signal which indicates that an overload of an adjusting drive has been reached, to change the distribution of the drive torques to the adjusting drives in such a manner that the adjusting drive which is reaching overload is relieved, or at least is not further loaded, while at least one other adjusting drive is loaded more in a supportive function, or is loaded in a manner which reduces its bracing function. In order to provide a support function and to relieve the adjusting drive which is reaching overload, an adjusting drive acting in the same drive direction can be actuated to provide more drive torque, and/or a bracing drive operating in the opposite drive direction can be actuated to provide less opposing, bracing drive torque. In both cases, the adjusting drive which is reaching overload is relieved.

Advantageously, said overload device can be designed in such a manner that the distribution of the drive torques which is provided anyway is maintained to the greatest extent possible, and the special distribution of drive torques provided for reasons of overload protection functions only to minimize the support provided by the other adjusting drives as much as possible, in order to prevent the respective adjusting drive which is close to overload from actually reaching overload, or at least from reaching a critical overload. The drive torque provided as a support function—whether the increase in a supportive drive torque or the reduction of an opposing, bracing drive torque—is therefore used sparingly by the control device, and is particularly only furnished to the degree which is necessary to protect the other adjusting drive from overload. As a result, the previously described, desired operating characteristics of the adjusting and/or drive device, in particular the explained bracing, are largely retained. However, this desired normal behavior—in particular the aforementioned bracing—of the entire adjustment and/or drive unit can be overwritten by the monitoring device, if necessary.

If the overload protection device intervenes in the above-mentioned manner, this can be reported to a higher-level control in an advantageous development of the invention, for example in order to enable executing this function at any time via remote monitoring. For this purpose, the overload protection device can issue an overload protection message and/or provide the same to an interface from which it can then be called up by the higher-level controller and/or remote monitoring device.

The aforementioned load determining devices, which individually determine the loads acting on the individual adjusting drives, can be designed in several different ways. In a further development of the invention, said load determining devices can each have a sensor element by means of which, for example, a load acting on the output shaft of the adjusting drives can be measured. Such a sensor element may in particular comprise a force and/or torque and/or strain and/or torsion measuring element, which may be functionally assigned to the output shaft of the adjusting drives. In principle, the previously explained sensor elements and/or load detectors can be employed for this purpose. By means of the same, the torque distribution can also be controlled for the purpose of bracing. Accordingly, reference is hereby made in this respect to the preceding description.

According to the required support and/or according to the current operating state of the torque distribution, the overload protection device can take various measures to provide support. For example, the number of adjusting drives working in the target direction of rotation and/or the number of adjusting drives working in the opposite, bracing-adjustment direction can be modified to support an adjusting drive which is reaching overload. For example, if four adjusting drives are working in the target direction of rotation and two adjusting drives are working in the opposite, bracing adjustment direction, one or both of the adjusting drives working in the opposite, bracing direction of rotation can be switched off and/or switched to idle if one or more of the adjusting drives working in the target direction of rotation is about to reach overload. Optionally, one or both of the adjusting drives working in an opposing, bracing manner can also be switched to work in the target direction of rotation rather than to provide an opposing, bracing function.

Alternatively, or in addition to such a modification of the number of adjusting drives working in the respective directions, the drive torque distribution within an adjusting drive group operating in the same direction can be modified to protect or relieve an adjusting drive which is reaching overload. For example, if three adjusting drives are working in the target direction of rotation and two further adjusting drives are working in the opposite, bracing direction of rotation in the manner described above, one or two of the adjusting drives operating in the target direction of rotation can be controlled in such a manner that they provide more drive torque in the event that the third adjusting drive of these, working in the target direction of rotation, is about to reach overload, by way of example.

Advantageously, the control device can be designed in such a manner that it first attempts to maintain a desired state of bracing—that is, the ratio of the drive torques operating in the target direction of rotation to those operating in the opposite direction of rotation—and/or to initially leave the strength of the bracing—that is, the absolute magnitude of the drive torques operating in opposition, in each case considered in sum—unchanged, and/or to control said drive torques according to the external loads in the manner previously explained and, as far as possible, to prevent overload conditions of individual adjusting drives by variably distributing the drive torque among the adjusting drives working in the same direction so as to avoid overloading individual adjusting drives, and to modify the aforementioned ratio of the drive torques operating in an opposing manner, and/or their absolute magnitudes, only if the aforementioned first stage—that is, the modification of the drive torque distribution within a group—is no longer sufficient to achieve a reliable overload protection.

The distribution and modification of the drive torque of the individual adjusting drives—that is, on the one hand, a capping and/or the reduction of the drive torque of the adjusting drive which is about to reach overload, and on the other hand an increase or decrease of the drive torque of at least one other adjusting drive working in a supporting manner or working in a bracing manner—can be accomplished in several different ways based on controlling. For this purpose, the control device can particularly employ the strategies already explained above—by way of example, variably modifying the spread of the target rotation speed, and/or modifying the motor characteristics of the adjusting drives and/or individual target speed specifications by the rotation speed controller, and/or modifying the motor characteristics according to the target rotation speed specified by a higher-level rotation speed controller.

The aforementioned overload protection device can provide further measures to prevent the negative consequences of overloads when required, if the control-based overload protection is no longer sufficient. In particular, the overload protection device can provide or have overload brakes which can be actuated by individual adjusting drives, or all adjusting drives, if the load determining device signals an imminent overload at one or more adjusting drives. In particular, if an adjusting drive becomes mechanically blocked, further damage can be prevented by the actuation of the overload brakes.

Alternatively or in addition to such an overload protection brake, which can be operated advantageously according to the signal of the load determining devices, it is also possible to provide a predetermined breaking point in the adjusting drive, advantageously in the output shaft which connects the output gear, which is in engagement with the components which are rotated, to a gear unit via which the motor drives the output shaft.

In order to additionally counteract the undesirable compliances in the drive train, and additionally to counteract the resultant dynamic effects and to assist the controlling of the adjusting drive bracing, as well as to simplify maintenance and repair, according to a further aspect of the present invention, the at least two adjusting drives, the assemblies which can be rotated relative to each other by the same, and the control device including the optionally provided plurality of rotation speed controllers can be grouped into a preassembled installation module or installation assembly which can be installed in the manner of a plug-and-play module between the two system components which are rotated relative to each other—in particular between the tower of a wind power plant and its nacelle, and/or a tower piece which supports the nacelle. Advantageously, the assemblies which are integrated into the installation module and which can be rotated relative to each other comprise connecting means for this purpose, by means of which the further system components can be connected in a simple manner to the installation module. These connecting means can particularly comprise mechanical fastening devices, for example detachable bolted connections. However, the connecting means may also include electrical and/or signaling and/or power supply connecting means, such as electrical current conduction connections, signal line connections, and/or hydraulic connections, such that the installation module can be connected/linked in a simple manner to the connectable system components.

In an advantageous embodiment of the invention, in order to increase the internal torsional stiffness of the adjusting drives, an at least approximately symmetrical support of the load on the drive gear of the adjusting drive at the output end can be achieved by a two-sided bearing. In particular, an output shaft of the adjusting drive, particularly of the gear unit of the adjusting drive, on which said drive gear—in particular, drive pinion—is arranged, can be supported radially on both sides of the drive gear by bearings, wherein in addition to the radial support, an axial component can also optionally be accommodated.

The bearing provided on both sides can be integrated in this case into the respective adjusting drive unit, for example to support the shaft which carries the output pinion on both sides of the drive pinion on a housing of the drive unit, in particular the gear unit thereof. Alternatively, at least one of the bearings can be supported directly on the assembly on which the adjusting drive unit is attached. For example, the assembly in this case may comprise a receiving cup and/or two bearing supports spaced apart from each other, wherein the adjusting drive unit can be inserted into the same in such a manner that at least one of the bearings can be supported directly on the assembly. Even if both bearings are integrated into the adjusting drive unit and its housing and supported thereon, the assembly on which the adjusting drive unit is attached can include such a bearing cup or bearing support provided in such a manner, to firmly support the adjusting drive unit in the region of the two bearings. In this way, a direct power flow and a direct conduction of the bearing forces into the assembly can be achieved.

The above-mentioned assemblies which can rotate relative to each other can form the bearing rings of a large diameter slewing ring and/or large diameter plain bearing, by way of example, or comprise the same, or be attached to the same, wherein the adjusting drives may advantageously be arranged inside the interior space bounded by the bearing rings. Such a large diameter slewing ring and/or large diameter plain bearing can form, for example, an azimuth bearing which can have, on the one hand, connecting means for the connection to an upper end section of a tower of a wind power plant, and/or, on the other hand, connecting means for the connection to the wind power plant nacelle and/or a tower section carrying the nacelle.

In principle, however, the adjusting and/or drive unit can also be used for other adjustment applications—for example as a slewing ring or rotary drive of a crane or an excavator, although said use as an azimuth adjusting drive and/or pitch angle adjusting drive of a wind power plant offers particular advantages.

By combining said components of the adjusting and/or drive unit into a preassembled installation module, not only is it possible to achieve increased rigidity in the mounts of the assemblies which will be connected, thereby reducing undesirable dynamic effects, but other diverse advantages can also be achieved—such as smaller bearing sizes due to a rigid connection construction at the bearing. On the one hand, the individual components can be assembled in advance by the manufacturer, resulting in a considerable logistical advantage. On the other hand, more space remains in the wind power plant nacelle and/or in the turbine house, since the adjusting drives are moved into the installation module between the tower and the turbine house. This makes it possible to enlarge escape routes and facilitate access to the main drivetrain of the plant.

On the other hand, the drives mounted in the preassembled installation assembly are more easily accessible, which facilitates maintenance, repair and replacement. In particular, however, it is possible to avoid the flexibility and compliance of the to-date conventional adjusting drive mounts and the azimuth bearing mounts, said flexibility and compliance arising in the currently-prevalent machine supports of conventional wind power plants.

BRIEF DESCRIPTION OF THE DRAWINGS

The invention will be explained in more detail below with reference to preferred embodiments and associated drawings, wherein:

FIG. 4(a) shows a schematic illustration of an adjusting drive of an azimuth module from the preceding figures, wherein the partial view of FIG. 4(a) illustrates the plain bearing between the crown gear and the housing ring, and wherein FIG. 4(a) illustrates a single-sided support of the drive pinion.

FIG. 4(c) shows a schematic illustration of an adjusting drive of an azimuth module from the preceding figures, wherein the partial view of FIG. 4(c) shows two further advantageous installation options for an adjusting drive with roller bearings and plain bearings.

FIG. 4(h) shows a schematic illustration of an adjusting drive of an azimuth module from the preceding figures, wherein FIG. 4(h) shows a bearing ring similar to the partial view of FIG. 4(d), according to a further embodiment, according to which said bearing ring has open, notch-like bearing recesses on one side for the adjusting drives, such that the adjusting drives can be inserted transversely to the axis of rotation of the rotary unit.

FIG. 5 shows a schematic illustration of an azimuth module, having a total of six adjusting drives, wherein the adjusting drives are shown in different states of bracing to illustrate the stepwise switching of the bracing.

FIG. 6 shows a rotation speed/torque diagram in which the motor characteristic curves of differently controlled adjusting drives and the resulting bracing torques are shown.

FIG. 7 shows a schematic illustration of the control device for controlling/regulating the adjusting drives of the adjustment and/or drive unit in the preceding figures.

DETAILED DESCRIPTION

Figure 1:
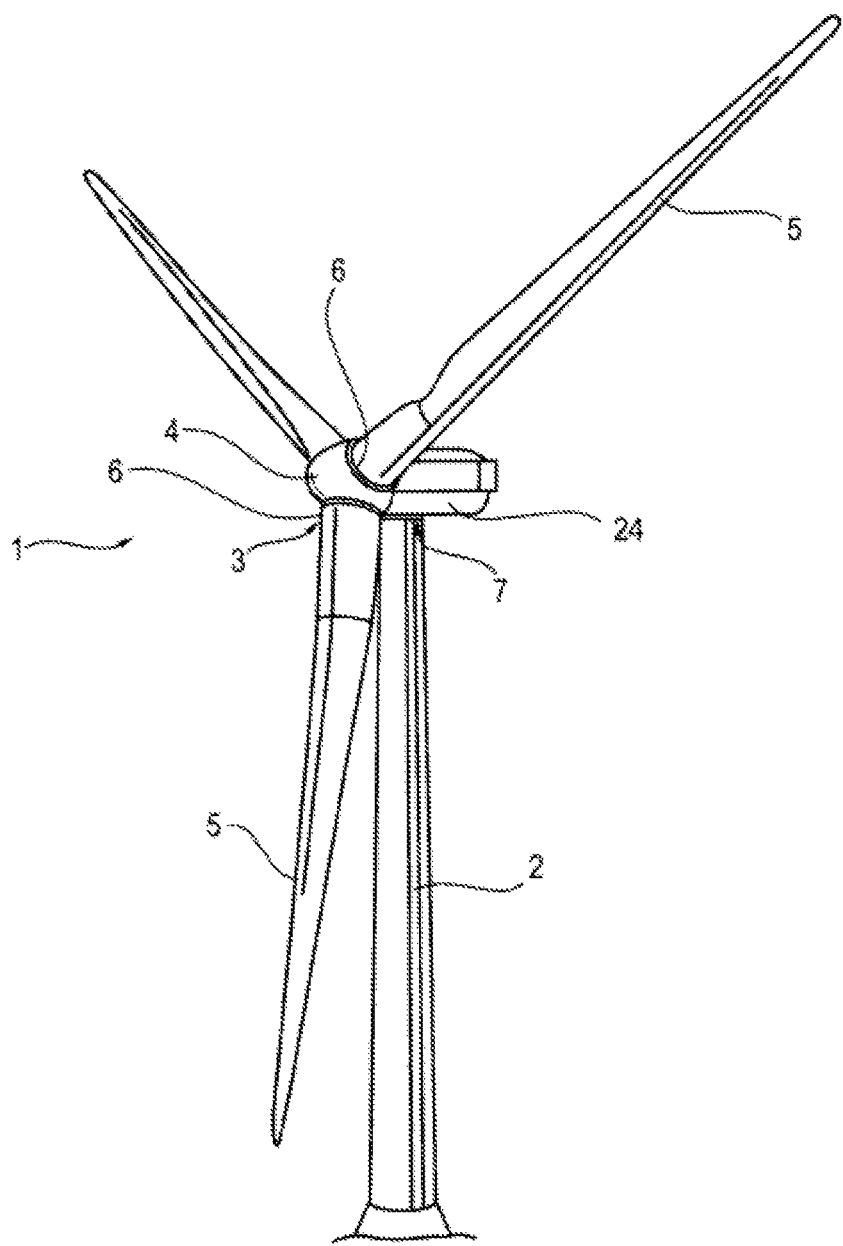
FIG. 1 shows a schematic perspective view of a wind power plant which comprises an adjustment and/or drive unit for adjusting the azimuth angle of the nacelle, which is designed in an advantageous embodiment of the invention as an azimuth installation module.

As shown in FIG. 1, the rotor 3 of a wind power plant 1 can be rotatably mounted about a horizontal rotor axis on a nacelle 24 and/or a turbine house, which can be arranged on a tower 2 and rotated about an upright axis, to enable orienting the rotor 3 with respect to the wind direction. The generator, control assemblies for the same, and additional energy converter assemblies and auxiliary assemblies can be housed in a conventional manner in said nacelle 24.

The rotor hub 4 rotatably mounted on the nacelle 24 about the horizontal rotor axis carries a plurality of rotor blades 5 which are rotatably mounted on the rotor hub 4 about rotor blade longitudinal axes, in such a manner that the blade angle or pitch angle of the rotor blades can be adapted to operating conditions, in particular to the wind speed and the generation status of the wind power plant. For this purpose, pitch adjustment units and/or drive units can be included in a manner which is known per se.

To bring the nacelle 24 into the desired angular position—that is, to move the same to a desired azimuth angle—an adjustment and/or drive unit 20 is included between the tower 2 and the nacelle 24, is designed and pre-assembled as an azimuth installation module, and comprises an azimuth bearing 7 which provides the upright axis of rotation for the nacelle 24 relative to the tower 2. Said azimuth bearing 7 can be in the form of a large diameter slewing ring and/or large diameter plain bearing in this case, and can comprise two bearing rings 8 and 9 which are mounted—for example by the plain bearing 10 shown in FIG. 4 (a) or the roller bearings 110 shown in FIG. 4 (b)—to rotate relative to each other in opposite directions.

The above-mentioned bearing rings 8 and 9, optionally with module housing rings rigidly attached thereto, define a—roughly speaking—cylindrical interior in which a plurality of adjusting drives 11 is accommodated to rotate the bearing rings 8 and 9 opposite each other, and have suitable connecting means for attachment on the tower 2 and/or the nacelle 24 or a tower section which bears the same.

Figure 4A:
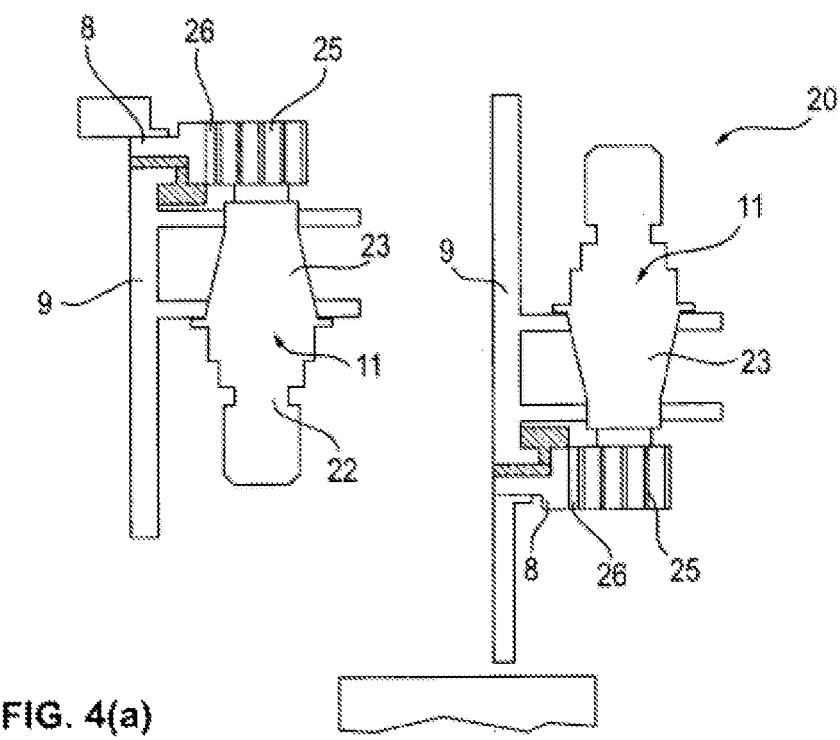

As the partial view of FIG. 4(a) shows, the adjusting drives 11 may be attached, by way of example, to two bearing supports 21 which are spaced apart from each other, and which may be designed with a plate shape, for example. The adjusting drives 11 can comprise electric motors 22 which drive, via a gear unit 23, a pinion 25 which meshes with a crown gear 26 which is rigidly connected to the other of the two bearing rings, such that a rotation of the pinion 25 leads to a rotation of the two bearing rings 8 and 9 in opposite directions.

Figure 4B:
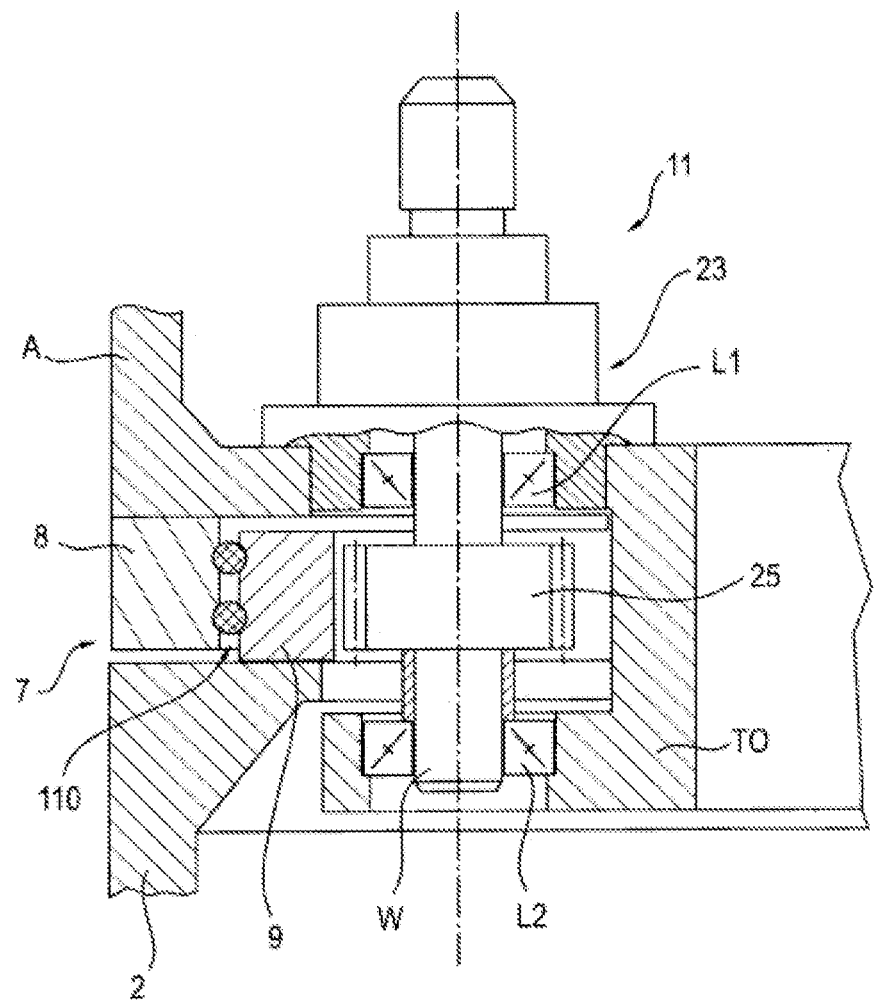
FIG. 4(b) shows a schematic illustration of an adjusting drive of an azimuth module from the preceding figures, wherein the partial view of FIG. 4(b) shows a symmetrical, two-sided mounting of the drive pinion of an adjusting drive unit which is attached to an azimuth module.
Figure 4D:
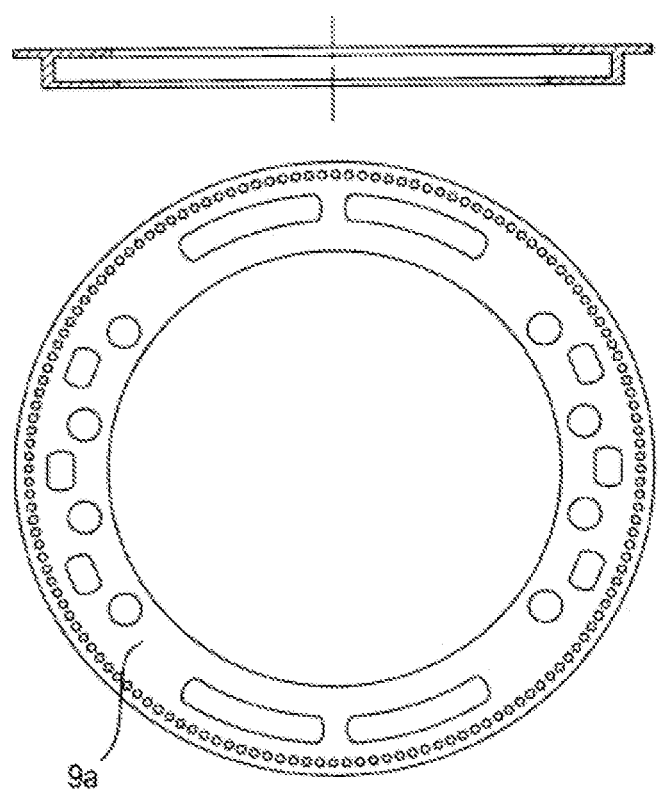
FIG. 4(d) shows a schematic illustration of an adjusting drive of an azimuth module from the preceding figures, wherein the further partial view of FIG. 4(d) shows a bearing ring for the adjusting drives with bearing recesses provided therein.
Figure 4E:
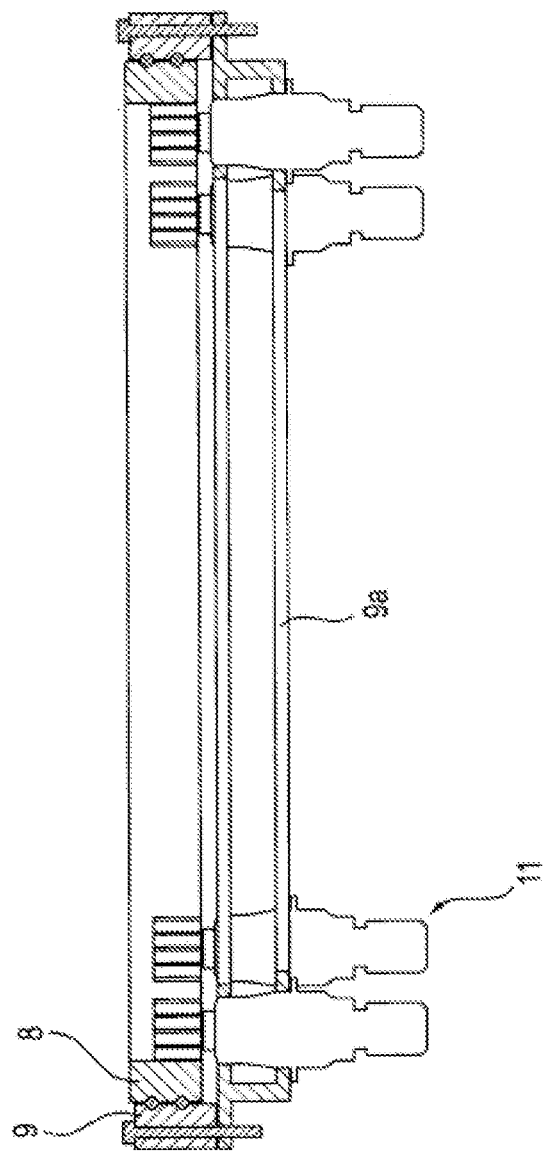
FIG. 4(e) shows a schematic illustration of an adjusting drive of an azimuth module from the preceding figures, wherein the partial view of FIG. 4(e) shows said bearing ring in cross-section, with adjusting drives installed therein.
Figure 4F:
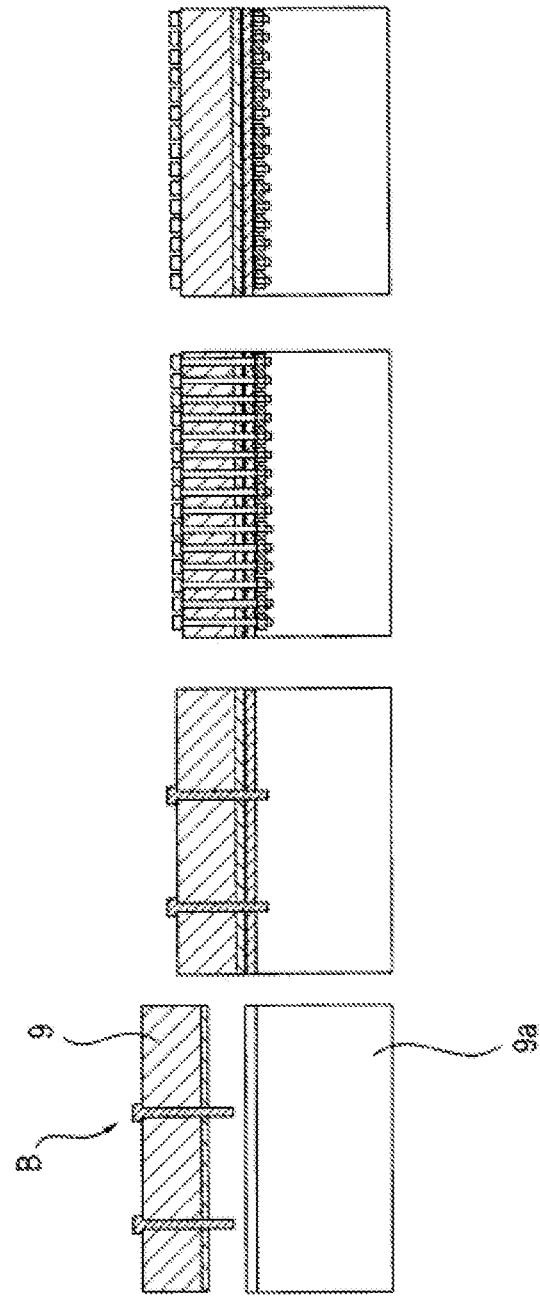
FIG. 4(f) shows a schematic illustration of an adjusting drive of an azimuth module from the preceding figures, wherein the partial view of FIG. 4(f) shows the arrangement of the connecting bolts in the bearing ring.
Figure 4G:
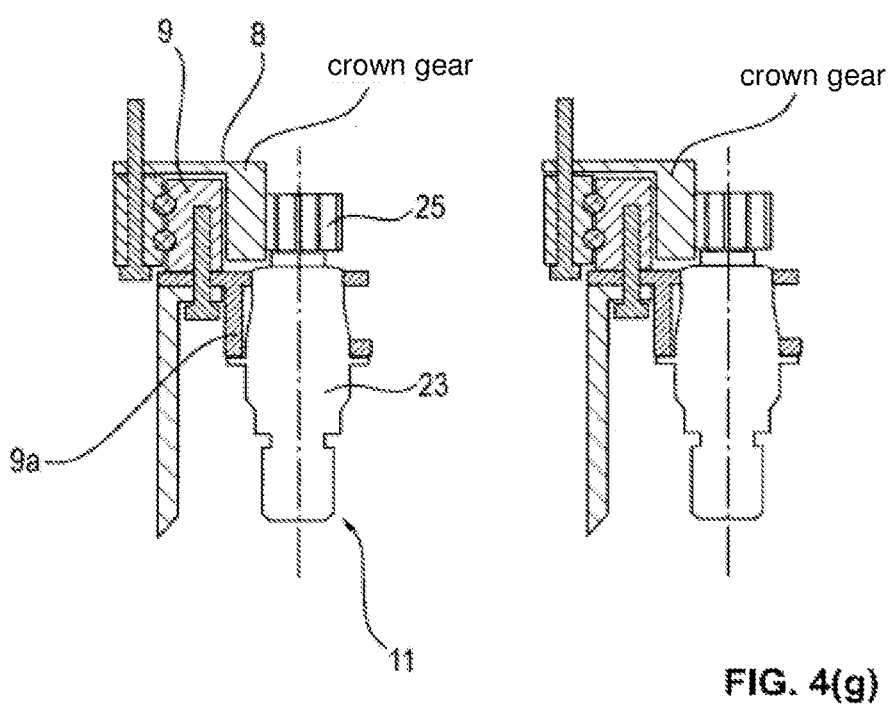
FIG. 4(g) shows a schematic illustration of an adjusting drive of an azimuth module from the preceding figures, wherein the partial view of FIG. 4(g) shows a further installation option for the adjusting drives and the fixation by means of bolts on the outer ring of the rotary unit.
Figure 4H:
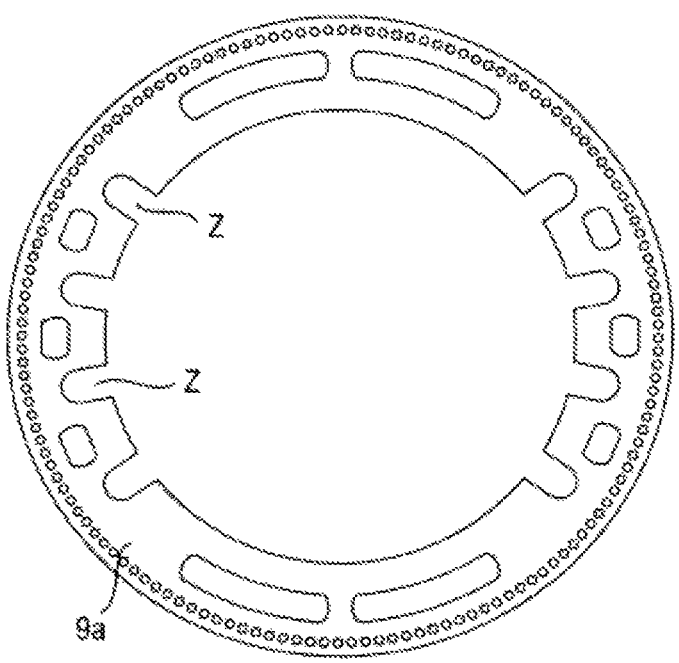

As the partial view of FIG. 4(b) shows, each of the output gears 25 of the adjusting drives 11 can advantageously also be supported and/or mounted on two sides—in particular, mounted at least approximately symmetrically. In this case, a bearing L1 provided on the gear unit side can support the shaft W bearing the pinion 25 in the housing of the adjusting drive 11, in particular the gear unit housing thereof. In addition to this bearing L1 on the gear unit side, the shaft W bearing the pinion 25 can be supported by a second bearing L2 which is situated on the side of the pinion 25 which is remote from the gear unit 23. This additional bearing L2 can also be provided in principle in a portion of the gear unit housing, and supported thereon. As the partial view of FIG. 4(b) shows, however, said bearing L2 can also be arranged in a section of the azimuth module A, in order to support the pinion 25 and/or the shaft W directly on the azimuth module. For this purpose, the azimuth module A can have a bearing cup TO which extends into the tower 2, and into which the adjusting drive 11 can be inserted with the aforementioned shaft W. Alternatively, the installation- and/or connection interface can be placed elsewhere. For example, the output shaft W shown in FIG. 4 (b) can form an assembly which is integrated into the azimuth module A via the bearings L1 and L2, and which is brought into engagement with an output element of the adjusting drive 11—for example, a planet carrier of the final gear stage—by means of splines.

Advantageously, the bearings L1 and L2 provided on both sides of the pinion 25 can be supported directly on structural support parts of the azimuth module A in order to implement a direct flow of force.

In a kinematic reversal of the embodiment according to FIG. 4 (b), it would also be possible to attach the adjusting drive 11 in an analogous manner not to the azimuth module, but rather to the tower module to which the azimuth module is connected.

Figure 2:
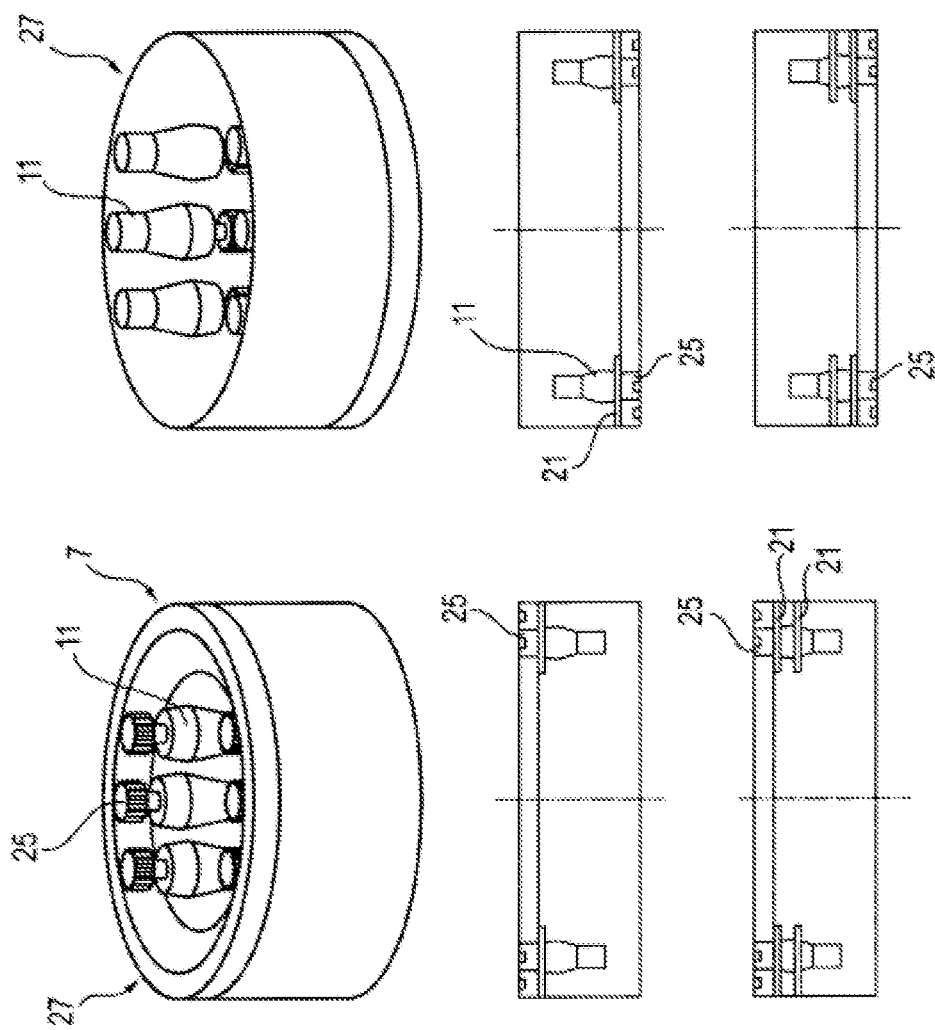
FIG. 2 shows a schematic illustration of the azimuth installation module of FIG. 1 in various installation positions.

Furthermore, it would be possible to overturn the arrangement shown in FIG. 4 (b) and, as it were, to position the adjusting drive 11 upside down, as illustrated in a similar manner in FIG. 2.

The partial view of FIG. 4 (c) shows further installation options with a suspended adjusting drive arrangement, wherein the adjusting drives are installed with a drive pinion positioned at top such that the output shaft W extends from the pinion 25 downward to the gear unit 23 positioned below the pinion 25. The electric motor 22 can in turn lie below the gear unit 23.

The suspended adjusting drive 11 in this case is then held on a bearing ring 9a shown in the partial view of FIG. 4 (d), which can be attached to the upper end of a tower and connected to the stationary bearing ring 9, by way of example, wherein a bolt connection B can simultaneously fasten the bearing rings 9 and 9a to each other and to the tower (see FIG. 4 (c)). The two variants shown in FIG. 4 (c) differ from each other in that the rotatable bearing ring 8, which is driven by the pinion 25, is supported on the stationary bearing ring 9 by means of roller bearings or by means of plain bearings. The support in this case can be implemented with respect to one or both parts 9 and 9a, as illustrated on the right side and by the plain bearing assembly shown there, for example.

As illustrated by the partial view of FIG. 4 (d), the bearing ring 9a can have recesses into which the adjusting drives 11 can be pushed or inserted in the direction of the longitudinal axis of the adjusting drives, and in particular can be pulled out from the bottom and/or inserted upwards. In addition, said bearing ring 9a can have a plurality of bolt recesses to allow insertion of the bolts of the bolt connection B.

The sectional view of partial view of FIG. 4 (e) shows the adjusting drives 11 and the bolt connection B seated in the recesses of the bearing ring 9a, wherein, as partial view of FIG. 4 (f) shows, the bearing ring 9a for the adjusting drives 11 can be pre-assembled on the bearing ring 9, for example by bolts in every sixth bolt hole, in which threads can be included in order to enable the pre-assembly. During the installation on the tower, all of the bolts can then be set and secured by nuts, as shown in the right portion of FIG. 4 (f).

According to partial view of FIG. 4 (g), the bearing ring 8 which will be rotated can also form the outer ring, while the stationary bearing ring 9 can be arranged on the inside.

As the partial view of FIG. 4 (h) shows, the bearing ring 9a can also have recesses Z open towards one side—in particular, towards the inside—into which the adjusting drives can be inserted transversely to their longitudinal axis. If the bearing ring and/or cup 9a is installed in a horizontal orientation, the adjusting drives 2 can be inserted horizontally into the recesses Z. The adjusting drives 2 can have sufficiently large—in the illustrated embodiment, oval—collars which cover the slot-shaped or notch-like recesses Z (see FIG. 4 (h)).

As shown in FIG. 2, the adjusting drives 2 can be installed in several different manners, and/or the pre-assembled azimuth module can assume different installation positions, for example such that the pinions 25 come to lie above the electric motors 22 and/or come to lie on an upper edge section of the installation module 27. Alternatively, a reversed installation configuration, with the drive pinion at the bottom and/or on the lower end section of the installation module 27 can also be implemented (see FIG. 2). According to the installation position of the installation module, the adjusting drives 11 can be arranged stationary with the tower 2, or arranged co-rotating with the nacelle 24.

The adjusting drives 11 can be attached to only one retaining support or bearing support 21 or, as shown in FIG. 4, on two bearing supports 21 spaced apart from each other.

Figure 3:
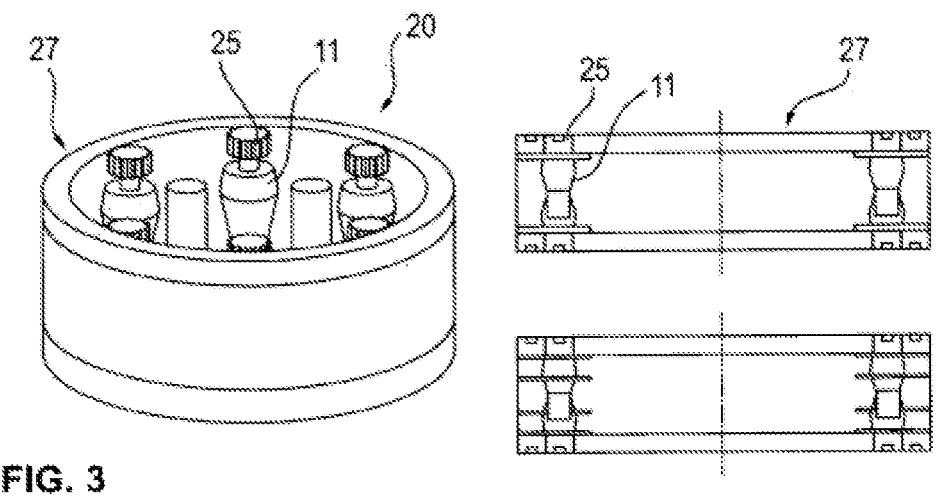
FIG. 3 shows a schematic illustration of an azimuth module similar to FIG. 2, according to a further embodiment of the invention according to which the adjusting drives are integrated into the module oriented in the opposite direction with respect to each other.

As shown in FIG. 3, adjusting drives arranged opposing each other can be included, such that a subset of the adjusting drives 11 has a pinion on the top, and/or the pinion 25 on the upper end section of the installation module 27, and another group of the adjusting drives has a pinion 25 on the bottom.

FIG. 7 illustrates software 30 implementable by a controller. As shown in FIG. 7, in which only two adjusting drives 11 are shown by way of example, a control device 12, which can also be integrated into the installation module 27, can have a plurality of rotation speed controllers 18a and 18b, for each motor, such a dedicated rotation speed controller is functionally assigned to each adjusting drive 11. These rotation speed controllers 18a and 18b for each motor can be designed, for example, as proportional controllers, and can comprise a downstream limiting stage 28 which can limit the target torque $_{Mtarg}$ specified to the adjusting drives 11. The aforementioned rotation speed controllers for each motor specify a torque to the adjusting drives 11 to which they are respectively assigned, and receive the measured rotation speed $\omega_{curr}$ of the respective adjusting drive 11.

A higher-level rotation speed controller 19 prespecifies a target rotation speed $\omega_{targ}$ to each rotation speed controller 18a and 18b for each motor. The prespecification of different target rotation speeds makes it possible to achieve a bracing, as illustrated in FIG. 6. The rotation speed controllers 18a and 18b for each motor can influence the characteristics of the respective adjusting drive 11, to thereby make the adjusting drive more yielding or more responsive, so as to accordingly conserve the gear unit and to make it last longer, or just to realize a sharper bracing.

In this case, the target rotation speeds of two adjusting drives 11 can differ by about 100 to 500 revolutions per minute, or can even differ to a greater degree—for example, by 3000 revolutions per minute or even more—wherein the motor characteristic can be modified, particularly being made flatter, by the speed controllers 18a and 18b for each motor. As illustrated in FIG. 6, it is possible by adjusting the motor characteristics, which can be shifted in accordance with the prespecified, different target rotation speeds, to achieve the bracing torque ΔM.

The higher-level rotation speed controller 19 in this case can also be designed as a proportional controller, and can form a bracing-adjustment device 14 together with the rotation speed controllers 18a and 18b for each motor by means of which the bracing of the adjusting drives can be variably adjusted in the desired manner, as explained in detail above.

As shown in FIG. 7, the higher-level controller 19 in this case can receive the target signal $\varphi_{targ}$ for the nominal azimuth angle and/or the target azimuth adjustment and the corresponding current-signal $\varphi_{curr}$ at its input, which is then converted into the target rotation speeds $\omega_{targ}$ for the rotation speed controllers for each motor. In this case, the external load can be taken into account by the higher-level controller 19, wherein in particular a wind signal, for example the wind speed $v_{wind}$ and/or a probable wind torque resulting from, or related to, the same, said wind torque acting on the nacelle and/or the rotor, can be taken into account. From this, a spread of the target rotation speed and/or different target rotation speeds for the various rotation speed controllers 18 for each motor is determined to adjust the bracing in the desired manner.

As illustrated in FIG. 5, in this case the bracing-adjustment device 14 can vary the number of the adjusting drives 11 which drive the adjustment in the target direction of rotation, and the number of the adjusting drives 11 which oppose such an adjustment. For example, in the case of wind loads which change back and forth, and an overall equilateral and/or symmetrical load, the same number of adjusting drives can work in the target direction of rotation as the number which is opposed to the target direction of rotation (see the illustration at the top left of FIG. 5, in which three adjusting drives 11 operate against three adjusting drives 11). In this case, the adjusting drives operating in the one direction of rotation are left-hatched (that is, with a hatching from bottom right to top left), while the adjusting drives operating and/or braking in the opposite direction are right-hatched to illustrate the group-wise bracing and variability thereof in FIG. 5.

According to the wind load and/or loads and/or the desired bracing, however, other constellations such as five to one, four to two, or six to zero can be implemented (see adjusting drives 11a, 11b, 11c, 11d, 11e and 11f in FIG. 5 and the other partial views).

Figure 9:
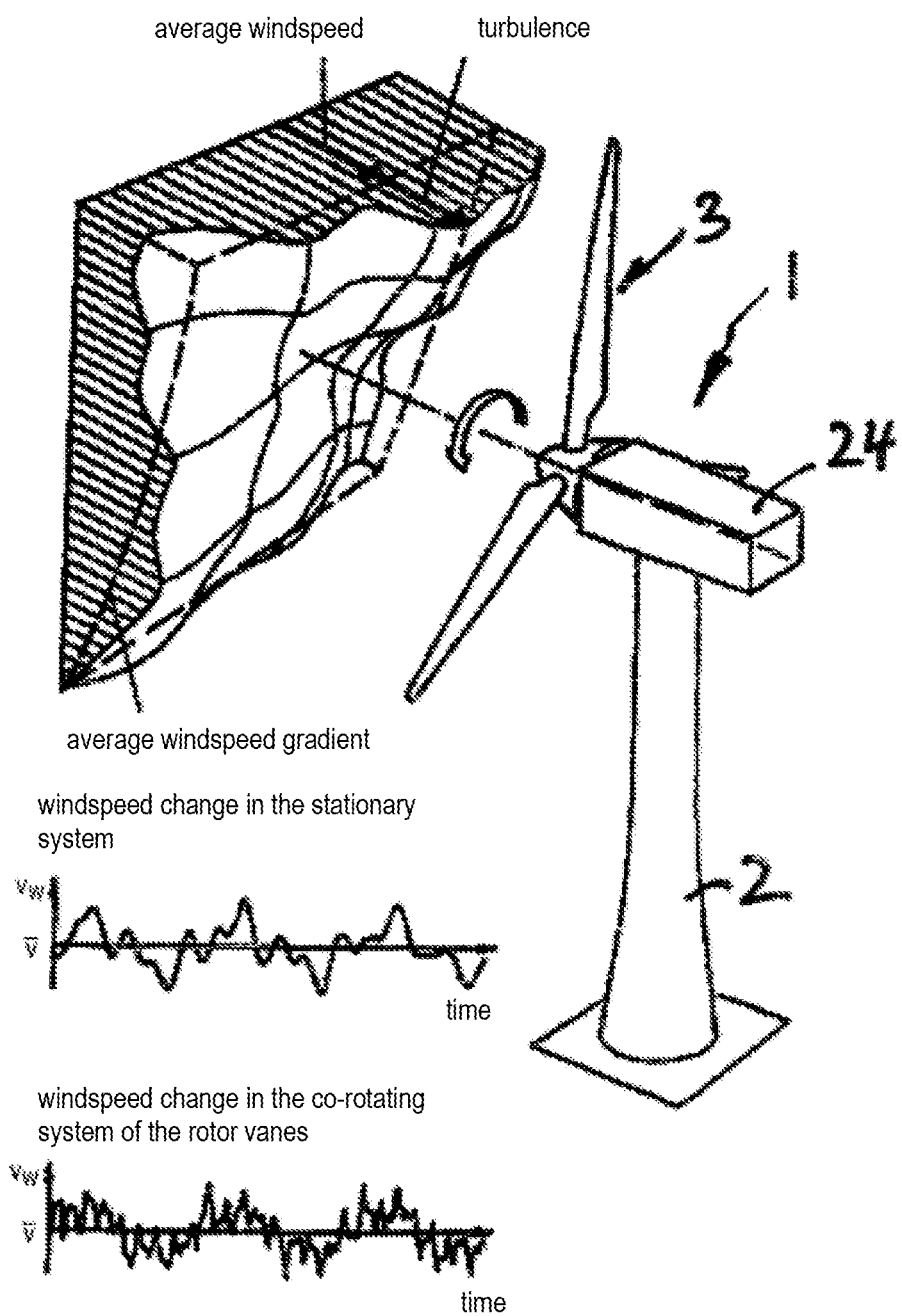
FIG. 9 shows a perspective, schematic illustration of a wind field inducing the external loads on the adjustment and/or drive unit of the wind power plant, wherein in addition to a topographical representation of the wind field, a diagrammatic illustration is given of the associated wind speed changes in a stationary system, along with a diagrammatic representation of the wind speed changes in a co-rotating system of the rotor blades of the wind power plant.

According to the formation of the wind field and the position of the rotor relative to the wind field, different wind loads and load amplitudes can arise. As illustrated in FIG. 9, a wind field is generally not uniform as considered via a relevant cross-section—by way of example the cross-sectional area swept by the rotor blades. Rather, it exhibits different wind speeds at different points in that cross-section, wherein wind speeds can increase both over the height and transverse thereto. As the two diagrammatic representations of FIG. 9 illustrate, the wind speed changes in the stationary system imply wind speed changes derived therefrom in the co-rotating system of the rotor blades.

Although when the (limited) cross-section is observed at a specific point in time, the wind field can have an approximately homogeneous wind direction in this limited cross-section—that is, a wind direction which hardly changes over the cross-section—substantially characterized by the different wind speeds, when observed over time, rotating wind directions also become relevant.

Asymmetrical—that is, substantially unilateral—wind loads arise mainly by oblique flow to the rotor, which can occur, for example, when the wind direction rotates.

Load amplitudes arise mainly due to the uneven distribution of the wind speed on the rotor surface, as FIG. 9 illustrates. In FIG. 9, for example, the wind speed is highest at the top right. This creates a torque on the azimuth drive each time a rotor blade passes through this higher wind speed in the upper right sector. In order to be able to better control these fluctuations, the adjustment and/or drive unit can brace the adjusting drives 11 in the manner explained in detail at the outset, and variably control the bracing on the basis of the parameters also explained in the introduction.

Figure 8:
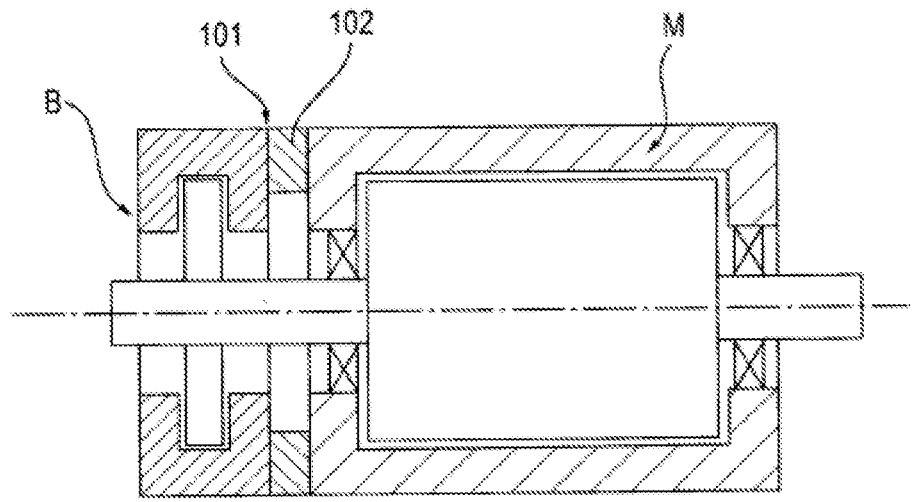
FIG. 8(a) shows a schematic, partially sectional view of an adjusting drive unit having a torque measuring device for measuring the induced torque, even at standstill, wherein in the partial view of FIG. 8(a), a measuring flange is included as a torque measuring device between a brake and the motor of the adjusting drive unit.
FIG. 8(b) shows a schematic, partially sectional view of an adjusting drive unit having a torque measuring device for measuring the induced torque, even at standstill, wherein in the partial view of FIG. 8(b), a corresponding measuring flange is included between the stator and/or motor housing and a connecting flange.
FIG. 8(c) shows a schematic, partially sectional view of an adjusting drive unit having a torque measuring device for measuring the induced torque, even at standstill, wherein in the partial view of FIG. 8(c), the arrangement of a load sensor is shown.
Figure 8:
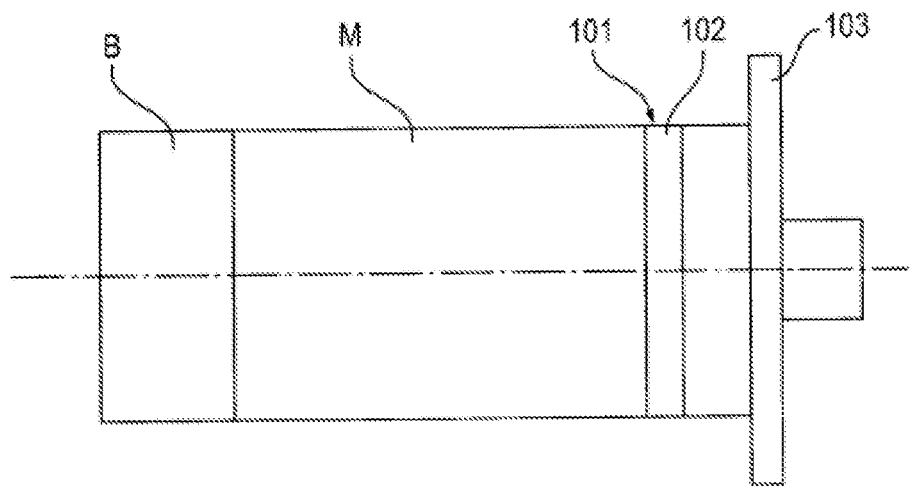
Figure 8:
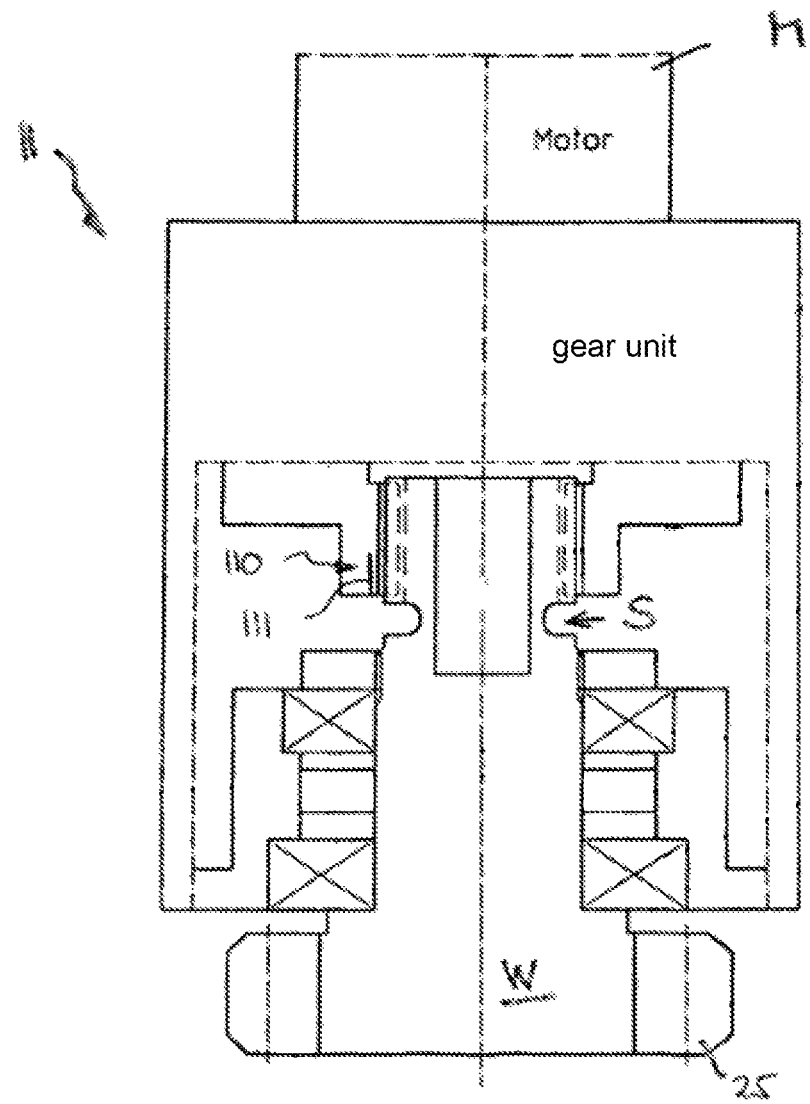

As FIGS. 8(a) and (b) show, the adjusting drives can have brakes B in order to be able to relieve the motors M at standstill and/or to be able to maintain an angular position once reached. As explained at the outset, however, the adjustment and/or drive unit can in principle also be kept at standstill without the action of such brakes B, by the adjusting drives 11 themselves and/or their motors being held at standstill.

In order to be able to measure the loads acting at standstill precisely, even when the motors M are switched off, the adjusting drives 11 can be assigned torque measuring devices 101, for example in the form of measuring flanges 102. FIG. 8(a) shows an installation variant of such a measuring flange 102 between the brake housing of the brake B and the stationary motor housing of the motor M.

Alternatively, such a measuring flange 102 can also be included between the motor housing of the motor M and a connecting flange 103, in order to measure the torque acting between the motor housing and said connecting flange. Such an installation variant has the advantage that even when the brake B is released, the torque can be determined—that is, when the torque is transmitted between the output shaft and the motor housing via the air gap of the motor M during operation of the motor.

As FIG. 8(c) shows, as an alternative or in addition to the mentioned torque measuring devices 101 as load determining devices 110, sensor elements 111 can also be provided on each of the adjusting drives 2, which can also measure the load and/or the torque and/or forces even when the drives are rotating and/or moving. Such measuring elements 111 can particularly each be assigned to the output shaft W of the adjusting drives 2 in order to be able to measure the load between the output pinion and the gear unit. The aforementioned measuring elements 111 can comprise torsion meters for measuring the torsion of the shaft, or force gauges or strain gauges or the like in order to measure load-relevant forces and/or torque and/or deformations.

The aforementioned load determining devices 110 in this case form part of an overload protection device 112, which protects the individual adjusting drives 2 from overloading, and reports the respective load status of the respective adjusting drive 2 to the control device 12 which controls the adjusting drives 2 and distributes the drive torque variably to the multiple adjusting drives 2.

If a load signal is received from one or more load determining devices 110, indicating that one or more adjusting drives 2 is reaching an overload state, the control device 12 changes the control of the adjusting drives 2 and generates control commands to the adjusting drives, such that they behave in such a manner that all drives are operated within their permitted ranges. In particular, the drive torque of the adjusting drive which is about to reach overload is capped and/or reduced. At least one further adjusting drive 2 which is not yet close to reaching overload is controlled in such a manner that it is more heavily loaded if it is working in the same direction as the adjusting drive which is reaching overload, or becomes less strongly bracing if it is opposing the drive which is reaching overload, as explained above. Said control device 12 in this case operates via the rotation speed controller 18 and/or changes other control parameters, as explained above for the bracing of the drives.

If a control-based intervention is insufficient, the overload protection device 112 can also take further measures—for example, activating the brakes B shown in FIGS. 8(a) and 8(b), in particular in order to preclude a mechanical locking of the adjusting drives 2 without further damage occurring.

Furthermore, the adjusting drives 2 can also be provided with predetermined breaking points, in particular in the region of the output shaft W, as shown in FIG. 8(c), in which the reference numeral S shows a predetermined breaking point in the output shaft W in the form of a notch.

We claim:

1. An adjustment and/or drive unit for adjusting an azimuth angle of a wind power plant turbine house, the adjustment and/or drive unit comprising:
a first assembly and a second assembly,
adjusting drives for rotating the second assembly relative to the first assembly, and
a controller,
wherein drive torques of the adjusting drives are variably adjustable via the controller, such that, when the second assembly is rotated in a target direction of rotation, at least a first adjusting drive of the adjusting drives is operated with a torque in one direction of rotation and at least a second adjusting drive of the adjusting drives is operated with a torque in a direction of rotation opposite to the one direction of rotation in order to establish a bracing of the adjusting drives, wherein a variable external load on the adjustment and/or drive unit and/or the adjusting drives is determinable via the controller, and wherein a strength of the bracing of the adjusting drives according to the variable external load on the adjusting drives is variably adjustable via the controller, and
wherein the controller is designed to increase the bracing of the adjusting drives in a step-wise or continuous manner when the variable external load increases and/or when fluctuations in the variable external load increases.

2. The adjustment and/or drive unit of claim 1, wherein the controller is designed to increase the strength of the bracing of the adjusting drives when wind speed increases.

3. The adjustment and/or drive unit of claim 1, wherein the controller is designed to implement, as wind loads vary, a symmetrical bracing in which the same number of adjusting drives of the adjusting drives are operated in the one direction of rotation as the number of adjusting drives of the adjusting drives operated in the direction of rotation opposite to the one direction of rotation, and wherein when wind loads lead to a greater loading of the adjusting drives on a first side of the adjustment and/or drive unit as compared to a second side of the adjustment and/or drive unit, to implement an asymmetric bracing in which more adjusting drives of the adjusting drives are operated in the one direction of rotation than the number of adjusting drives of the adjusting drives which are operated in the direction opposite to the one direction of rotation, or to implement an asymmetric bracing in which fewer adjusting drives of the adjusting drives are operated in the one direction of rotation than the number of adjusting drives of the adjusting drives which are operated in the direction of rotation opposite to the one direction of rotation.

4. The adjustment and/or drive unit of claim 1, wherein the controller comprises a load amplitude determiner for determining load amplitudes occurring on at least one of the adjusting drives, and wherein the controller is designed to increase the strength of the bracing of the adjusting drives when the load amplitudes increase.

5. The adjustment and/or drive unit of claim 1, wherein the controller comprises a torque determiner for determining an average torque of the adjusting drives, and wherein the controller is designed to modify the bracing of the adjusting drives according to the average torque.

6. The adjustment and/or drive unit of claim 5, wherein the controller is designed to increasingly asymmetrically brace the adjusting drives to operate an increasingly greater number of adjusting drives of the adjusting drives in the one direction of rotation and/or an increasingly lesser number of adjusting drives of the adjusting drives in the direction of rotation opposite to the one direction of rotation when the average torque in the one direction of rotation increases more than the average torque in the direction of rotation opposite to the one direction of rotation, which indicates increasing one-sidedness of the variable external load on the adjustment and/or drive unit.

7. The adjustment and/or drive unit of claim 1, wherein the controller is designed to variably adjust the strength of the bracing of the adjusting drives according to wind power plant outputs to increase the strength of the bracing of the adjusting drives for higher wind power plant outputs of the wind power plant outputs and decrease the strength of the bracing of the adjusting drives for lower wind power plant outputs of the wind power plant outputs.

8. The adjustment and/or drive unit of claim 1, wherein the variable external load on the adjustment and/or drive unit and/or the adjusting drives is determinable via the controller during standstill of the adjustment and/or drive unit.

9. The adjustment and/or drive unit of claim 1, wherein a load status of the adjusting drives is monitorable via the controller, and wherein the adjusting drives are switchable between brake operation and motor operation and/or motor operation and brake operation in a phase of minimum torque of the adjusting drives and/or a phase of a torque of the adjusting drives which is low compared to an average torque of the adjusting drives.

10. The adjustment and/or drive unit of claim 1, wherein the controller is designed to adjust the strength of the bracing of the adjusting drives by modifying a number of adjusting drives of the adjusting drives which are operated with a torque in the one direction of rotation and/or by modifying a number of adjusting drives of the adjusting drives which are operated with a torque in the direction of rotation opposite to the one direction of rotation.

11. The adjustment and/or drive unit of claim 1, wherein the controller is designed to adjust the strength of the bracing of the adjusting drives by variably modifying a spread of target rotation speeds of the adjusting drives.

12. The adjustment and/or drive unit of claim 11, wherein the controller is designed to prespecify a target rotation speed of the target rotation speeds to at least one of the adjusting drives, which differs from the target rotation speed prespecified to at least one further adjusting drive of the adjusting drives by 100 to 500 revolutions per minute.

13. The adjustment and/or drive unit of claim 1, wherein the controller is designed to modify a motor characteristic of the adjusting drives.

14. The adjustment and/or drive unit of claim 1, wherein the controller is designed to prespecify a target torque ($_{Mtarg1}$) to at least one of the adjusting drives, which differs from at least one further target torque ($_{Mtarg2}$) prespecified to at least one further adjusting drive of the adjusting drives by at least 10 N m.

15. The adjustment and/or drive unit of claim 14, wherein the target torque ($_{Mtarg1}$) differs from the at least one further target torque ($_{Mtarg2}$) by 15 to 40 N m.

16. The adjustment and/or drive unit of claim 1, wherein each adjusting drive comprises a motor, and wherein the controller has a rotation speed controller for each motor of the adjusting drives, which prespecifies a torque to the respective, associated adjusting drive, and receives a current rotation speed of the associated adjusting drive, as well as a higher-level rotation speed controller which is superordinate to the rotation speed controller for each motor of the adjusting drives and which is designed to prespecify a target rotation speed to the rotation speed controller for each motor of the adjusting drives.

17. The adjustment and/or drive unit of claim 16, wherein the higher-level rotation speed controller has input channels for receiving multiple input signals comprising at least one target rotation angle ($\varphi_{targ}$) of the second assembly to be rotated, and a wind speed signal ($v_{Wind}$) and a torque signal ($M_{Wind}$), and wherein the higher-level rotation speed controller is designed to determine the target rotation speed ($\omega_{targ}$) for the rotation speed controllers as a function of the at least one target rotation angle ($\varphi_{targ}$), the wind speed signal ($v_{Wind}$), and the torque signal ($M_{Wind}$).

18. The adjustment and/or drive unit according to claim 16, wherein each rotation speed controller is designed to flatten a motor characteristic of the associated adjusting drive upon increasing target rotation speed spreads prespecified by the higher-level rotation speed controller.

19. The adjustment and/or drive unit of claim 1, wherein the controller is designed to receive load signals associated with each of the adjusting drives and to modify a distribution of drive torques of the adjusting drives upon receipt of a load signal indicating that an adjusting drive of the adjusting drives is reaching overload so the adjusting drive reaching overload is relieved of drive torque or at least not loaded with drive torque any further, and at least one further adjusting drive of the adjusting drives is loaded with drive torque or is relieved of drive torque.

20. The adjustment and/or drive unit of claim 19, wherein each adjusting drive comprises an output shaft, and wherein the adjustment and/or drive unit further comprises sensor elements for measuring loads acting on the output shafts of the adjusting drives.

21. The adjustment and/or drive unit of claim 20, wherein the sensor elements comprise a force and/or torque and/or strain and/or torsion measuring element.

22. The adjustment and/or drive unit of claim 21, wherein at least one adjusting drive of the adjusting drives comprises the force and/or torque and/or strain and/or torsion measuring element for determining the torque in the one direction of rotation or the torque in the direction of rotation opposite to the one direction of rotation.

23. The adjustment and/or drive unit of claim 1, wherein upon complete exhaustion of a control-based overload protection, brakes are configured to activate to hold and/or brake the adjusting drives.

24. The adjustment and/or drive unit of claim 1, wherein the adjusting drives each comprise at least one electric motor.

25. The adjustment and/or drive unit of claim 1, wherein the adjusting drives, the first and second assemblies, and the controller form a preassembled installation module, and wherein the first and second assemblies are connectable to other system components.

26. The adjustment and/or drive unit of claim 25, wherein the first and second assemblies comprise bearing rings of a large diameter slewing ring and/or large diameter plain bearing, and wherein the adjusting drives are arranged within an interior space bounded by the bearing rings.

27. The adjustment and/or drive unit according of claim 26, wherein the large diameter slewing ring and/or plain bearing forms an azimuth bearing which is connectable to a tower of a wind power plant and to the wind power plant turbine house of the wind power plant and/or to a tower section of the tower supporting the wind power plant turbine house.

28. The adjustment and/or drive unit of claim 1, wherein at least one of the adjusting drives is fastened to the first assembly and has a drive gear comprising a pinion, which has a rolling engagement with a ring comprising a crown gear, which is fixed to the second assembly, and is supported at least symmetrically by at least two bearings on first and second sides of the drive gear.

29. The adjustment and/or drive unit of claim 28, wherein the at least two bearings are directly or indirectly attached to the first assembly.

30. The adjustment and/or drive unit of claim 28, wherein a shaft carrying the drive gear is designed to be connectable to and plug into a gear unit and/or motor of the at least one of the adjusting drives in a detachable and/or torque-transmitting manner.

31. The adjustment and/or drive unit of claim 1, wherein a load torque acting on the adjusting drives, including the torque in the one direction of rotation of the at least a first adjusting drive and/or the torque in the direction of rotation opposite to the one direction of rotation of the at least a second adjusting drive, is determinable via the controller.

32. A method for controlling the adjustment and/or drive unit of claim 1, comprising:
   controlling the first adjusting drive of the adjusting drives so the first adjusting drive generates the torque in the one direction of rotation upon rotation of the second assembly relative to the first assembly;
   controlling the second adjusting drive of the adjusting drives to generate the torque in the direction of rotation opposite to the one direction of rotation in order to brace the first and second adjusting drives against each other upon rotation of the second assembly relative to the first assembly; and
   variably adjusting the strength of the bracing of the first and second adjusting drives against each other according to the variable external load on the first and second adjusting drives.

33. An adjustment and/or drive unit for adjusting an azimuth angle of a wind power plant turbine house, the adjustment and/or drive unit comprising:
   a first assembly and a second assembly,
   adjusting drives for rotating the second assembly relative to the first assembly, and
   a controller,
   wherein drive torques of the adjusting drives are variably adjustable via the controller, such that, when the second assembly is rotated in a target direction of rotation, and/or at standstill, at least a first adjusting drive of the adjusting drives is operated with a torque in one direction of rotation and at least a second adjusting drive of the adjusting drives is operated with a torque in a direction of rotation opposite to the one direction of rotation in order to establish a bracing of the adjusting drives, wherein a variable external load on the adjustment and/or drive unit and/or the adjusting drives is determinable via the controller, and wherein a strength of the bracing of the adjusting drives according to the variable external load on the adjusting drives is variably adjustable via the controller, and wherein the controller is designed to adjust the strength of the bracing of the adjusting drives as a function of pitch angle of at least one rotor blade to implement a stronger bracing of the adjusting drives for pitch angles which are used at higher wind speeds and/or higher system outputs than for pitch angles used at lower wind speeds and/or lower system outputs.

34. An adjustment and/or drive unit for adjusting an azimuth angle of a wind power plant turbine house, the adjustment and/or drive unit comprising:
- a first assembly and a second assembly,
- adjusting drives for rotating the second assembly relative to the first assembly, and
- a controller,
- wherein drive torques of the adjusting drives are variably adjustable via the controller, such that, when the second assembly is rotated in a target direction of rotation, and/or at standstill, at least a first adjusting drive of the adjusting drives is operated with a torque in one direction of rotation and at least a second adjusting drive of the adjusting drives is operated with a torque in a direction of rotation opposite to the one direction of rotation in order to establish a bracing of the adjusting drives, wherein a variable external load on the adjustment and/or drive unit and/or the adjusting drives is determinable via the controller, and wherein a strength of the bracing of the adjusting drives according to the variable external load on the adjusting drives is variably adjustable via the controller,
- wherein the controller is designed to receive load signals associated with each of the adjusting drives and to modify a distribution of drive torques of the adjusting drives upon receipt of a load signal indicating that an adjusting drive of the adjusting drives is reaching overload so the adjusting drive reaching overload is relieved of drive torque or at least not loaded with drive torque any further, and at least one further adjusting drive of the adjusting drives is loaded with drive torque or is relieved of drive torque,
- wherein each adjusting drive comprises an output shaft, wherein the adjustment and/or drive unit comprises sensor elements for measuring loads acting on the output shafts of the adjusting drives,
- wherein the sensor elements comprise a force and/or torque and/or strain and/or torsion measuring element,
- wherein at least one adjusting drive of the adjusting drives comprises the force and/or torque and/or strain and/or torsion measuring element for determining the torque in the one direction of rotation or the torque in the direction of rotation opposite to the one direction of rotation induced on the at least one adjusting drive of the adjusting drives at standstill of the adjustment and/or drive unit, and
- wherein the force and/or torque and/or strain and/or torsion measuring element comprises a measuring flange between a brake housing and a motor housing, and/or a measuring flange between the motor housing and a connecting flange of the at least one adjusting drive.

35. An adjustment and/or drive unit for adjusting an azimuth angle of a wind power plant turbine house, the adjustment and/or drive unit comprising:
- a first assembly and a second assembly,
- adjusting drives for rotating the second assembly relative to the first assembly, and
- a controller,
- wherein drive torques of the adjusting drives are variably adjustable via the controller, such that, when the second assembly is rotated in a target direction of rotation, and/or at standstill, at least a first adjusting drive of the adjusting drives is operated with a torque in one direction of rotation and at least a second adjusting drive of the adjusting drives is operated with a torque in a direction of rotation opposite to the one direction of rotation in order to establish a bracing of the adjusting drives, wherein a variable external load on the adjustment and/or drive unit and/or the adjusting drives is determinable via the controller, and wherein a strength of the bracing of the adjusting drives according to the variable external load on the adjusting drives is variably adjustable via the controller,
- wherein the controller is designed to receive load signals associated with each of the adjusting drives and to modify a distribution of drive torques of the adjusting drives upon receipt of a load signal indicating that an adjusting drive of the adjusting drives is reaching overload so the adjusting drive reaching overload is relieved of drive torque or at least not loaded with drive torque any further, and at least one further adjusting drive of the adjusting drives is loaded with drive torque or is relieved of drive torque,
- wherein each adjusting drive comprises an output shaft, wherein the adjustment and/or drive unit comprises sensor elements for measuring loads acting on the output shafts of the adjusting drives,
- wherein the sensor elements comprise a force and/or torque and/or strain and/or torsion measuring element,
- wherein at least one adjusting drive of the adjusting drives comprises the force and/or torque and/or strain and/or torsion measuring element for determining the torque in the one direction of rotation or the torque in the direction of rotation opposite to the one direction of rotation induced on the at least one adjusting drive of the adjusting drives at standstill of the adjustment and/or drive unit, and
- wherein the force and/or torque and/or strain and/or torsion measuring element comprises a rotation angle sensor for determining a rotation of an output gear comprising an output pinion, when the at least one adjusting drive is at standstill.

36. An adjustment and/or drive unit for adjusting an azimuth angle of a wind power plant turbine house, the adjustment and/or drive unit comprising:
- a first assembly and a second assembly,
- adjusting drives for rotating the second assembly relative to the first assembly, and
- a controller,
- wherein drive torques of the adjusting drives are variably adjustable via the controller, such that, when the second assembly is rotated in a target direction of rotation, and/or at standstill, at least a first adjusting drive of the adjusting drives is operated with a torque in one direction of rotation and at least a second adjusting drive of the adjusting drives is operated with a torque in a direction of rotation opposite to the one direction of rotation in order to establish a bracing of the adjusting drives, wherein a variable external load on the adjustment and/or drive unit and/or the adjusting drives is determinable via the controller, and wherein a strength of the bracing of the adjusting drives according to the variable external load on the adjusting drives is variably adjustable via the controller,
- wherein a load torque acting on the adjusting drives at standstill, including the torque in the one direction of rotation of the at least a first adjusting drive and/or the torque in the direction of rotation opposite to the one direction of rotation of the at least a second adjusting drive, is determinable via the controller, and
- wherein the adjustment and/or drive unit comprises a torque measuring flange which is between a stator of an electric motor of one of the adjusting drives of the adjusting drives and a brake of the one of the adjusting drives of the adjusting drives, or between the stator and a connecting flange of the one of the adjusting drives of the adjusting drives.

37. A method for controlling an adjustment and/or drive unit for adjusting an azimuth angle of a wind power plant turbine house,
wherein the adjustment and/or drive unit comprises:
a first assembly and a second assembly,
adjusting drives for rotating the second assembly relative to the first assembly, and
a controller,
wherein drive torques of the adjusting drives are variably adjustable via the controller, such that, when the second assembly is rotated in a target direction of rotation, and/or at standstill, at least a first adjusting drive of the adjusting drives is operated with a torque in one direction of rotation and at least a second adjusting drive of the adjusting drives is operated with a torque in a direction of rotation opposite to the one direction of rotation in order to establish a bracing of the adjusting drives, wherein a variable external load on the adjustment and/or drive unit and/or the adjusting drives is determinable via the controller, and wherein a strength of the bracing of the adjusting drives according to the variable external load on the adjusting drives is variably adjustable via the controller, and
wherein the method for controlling the adjustment and/or drive unit comprises:
individually monitoring the variable external load on each adjusting drive of the adjusting drives and/or a drive load of each adjusting drive of the adjusting drives via the controller, including the torque in the one direction of rotation of the at least a first adjusting drive and the torque in the direction of rotation opposite to the one direction of rotation of the at least a second adjusting drive;
modifying control of the adjusting drives via the controller so a distribution of drive torques, including the torque in the one direction of rotation of the at least a first adjusting drive and the torque in the direction of rotation opposite to the one direction of rotation of the at least a second adjusting drive, is modified when a load signal appears which indicates that one of the adjusting drives is reaching overload;
relieving of drive torque or at least not further loading with drive torque the adjusting drive which is reaching overload; and
loading with drive torque or relieving of drive torque at least one further adjusting drive of the adjusting drives.

38. An adjustment and/or drive unit for adjusting an azimuth angle of a wind power plant turbine house, the adjustment and/or drive unit comprising:
a first assembly and a second assembly,
adjusting drives for rotating the second assembly relative to the first assembly, and
a controller,
wherein drive torques of the adjusting drives are variably adjustable via the controller, such that, when the second assembly is rotated in a target direction of rotation, and/or at standstill, at least a first adjusting drive of the adjusting drives is operated with a torque in one direction of rotation and at least a second adjusting drive of the adjusting drives is operated with a torque in a direction of rotation opposite to the one direction of rotation in order to establish a bracing of the adjusting drives, wherein a variable external load on the adjustment and/or drive unit and/or the adjusting drives is determinable via the controller, and wherein a strength of the bracing of the adjusting drives according to the variable external load on the adjusting drives is variably adjustable via the controller,
wherein the controller is designed to receive load signals associated with each of the adjusting drives and to modify a distribution of drive torques of the adjusting drives upon receipt of a load signal indicating that an adjusting drive of the adjusting drives is reaching overload so the adjusting drive reaching overload is relieved of drive torque or at least not loaded with drive torque any further, and at least one further adjusting drive of the adjusting drives is loaded with drive torque or is relieved of drive torque,
wherein each adjusting drive comprises an output shaft, wherein the adjustment and/or drive unit comprises sensor elements for measuring loads acting on the output shafts of the adjusting drives,
wherein the sensor elements comprise a force and/or torque and/or strain and/or torsion measuring element,
wherein at least one adjusting drive of the adjusting drives comprises the force and/or torque and/or strain and/or torsion measuring element for determining the torque in the one direction of rotation or the torque in the direction of rotation opposite to the one direction of rotation induced on the at least one adjusting drive of the adjusting drives at standstill of the adjustment and/or drive unit,
wherein the force and/or torque and/or strain and/or torsion measuring element comprises a measuring flange or a rotation angle sensor,
wherein when the force and/or torque and/or strain and/or torsion measuring element comprises the measuring flange, the measuring flange is between a brake housing and a motor housing, or is between the motor housing and a connecting flange, or is between a stator of an electric motor and a brake, or is between the stator and the connecting flange of the at least one adjusting drive, and
wherein when the force and/or torque and/or strain and/or torsion measuring element comprises the rotation angle sensor, a rotation of an output gear comprising an output pinion is determinable via the rotation angle sensor when the at least one adjusting drive is at standstill.

* * * * *